United States Patent
Ohshima et al.

[11] Patent Number: 5,739,943
[45] Date of Patent: Apr. 14, 1998

[54] POLARIZATION CONTROL UNIT

[75] Inventors: Shigeru Ohshima, Yokohama; Tazuko Tomioka, Tokyo; Mitsuko Nakamura, Yokohama; Senji Shimanuki, Atsugi; Manish Sharma, Kawasaki; Hiroyuki Ibe, Yokohama; Hitoshi Takahira, Tokyo; Shu Yamamoto, Shiki, all of Japan

[73] Assignees: Kabushiki Kaisha Toshiba, Kawasaki; Kokusai Denshin Denwa Co., Ltd., Tokyo, both of Japan

[21] Appl. No.: 697,446

[22] Filed: Aug. 23, 1996

[30] Foreign Application Priority Data

Aug. 24, 1995 [JP] Japan ................ 7-215736
Aug. 24, 1995 [JP] Japan ................ 7-215790
Feb. 6, 1996 [JP] Japan ................ 8-019890

[51] Int. Cl.$^6$ .......................................... G02F 1/09
[52] U.S. Cl. .................... 359/281; 359/484; 324/244.1; 356/350
[58] Field of Search .................. 359/281, 256, 359/484, 305; 324/244.1, 96; 356/350

[56] References Cited

U.S. PATENT DOCUMENTS

| | | | |
|---|---|---|---|
| 4,539,521 | 9/1985 | Matsumoto | 359/281 |
| 4,812,767 | 3/1989 | Taketomi | 324/244.1 |
| 4,997,282 | 3/1991 | Pavlath | 356/350 |
| 5,050,968 | 9/1991 | Ohara | 359/281 |
| 5,535,046 | 7/1996 | Shirai et al. | 359/281 |

FOREIGN PATENT DOCUMENTS

| | | |
|---|---|---|
| 60-129727 | 7/1985 | Japan . |
| 62-145213 | 6/1987 | Japan . |
| 1-113721 | 5/1989 | Japan . |
| 6-308547 | 11/1994 | Japan . |
| 7-13111 | 1/1995 | Japan . |
| 7-13112 | 1/1995 | Japan . |

OTHER PUBLICATIONS

Technical Digest of the Fifth Optoelectronics Conference, pp. 8–9, Jul. 1994, Reinhold NOE, et al., "Wavelength–Selective Polarimeter and Polarization–Independent Depolarizer Based on Ti:LiNbO$_3$ Acoustooptical TE–TM Converters".

*Primary Examiner*—Loha Ben
*Attorney, Agent, or Firm*—Oblon, Spivak, McClelland, Maier & Neustadt, P.C.

[57] ABSTRACT

Light beams emitted from an optical fiber are converted into parallel light beams by a lens, and then allowed to pass through a Faraday device, followed by being converged to an incident end of the optical fiber by a lens. The Faraday device is applied with a magnetic field in a direction of the optical axis thereof from a coil. Moreover, the Faraday device is applied with a magnetic field in a direction perpendicular to the optical axis by a pair of magnets. When an electric current flowing in a coil 74 is changed from I to −I, the direction of a synthesized magnetic field can be rotated. Therefore, by arbitrarily changing the electric current flowing in the coil, polarization of transmission light can be controlled.

20 Claims, 8 Drawing Sheets

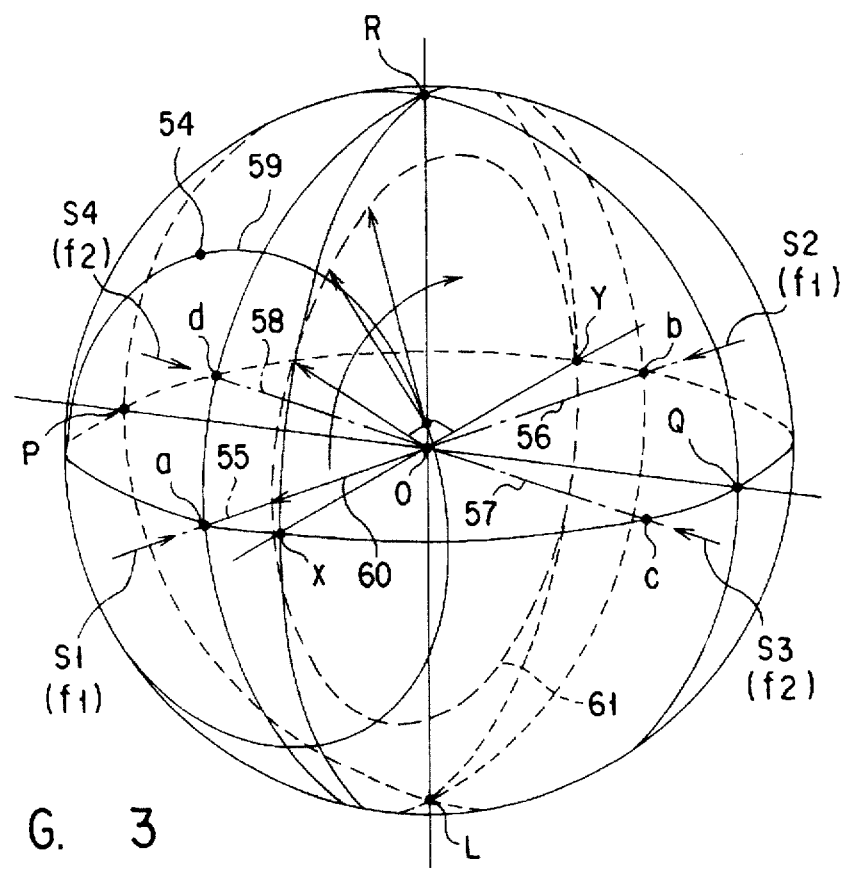
F I G. 3

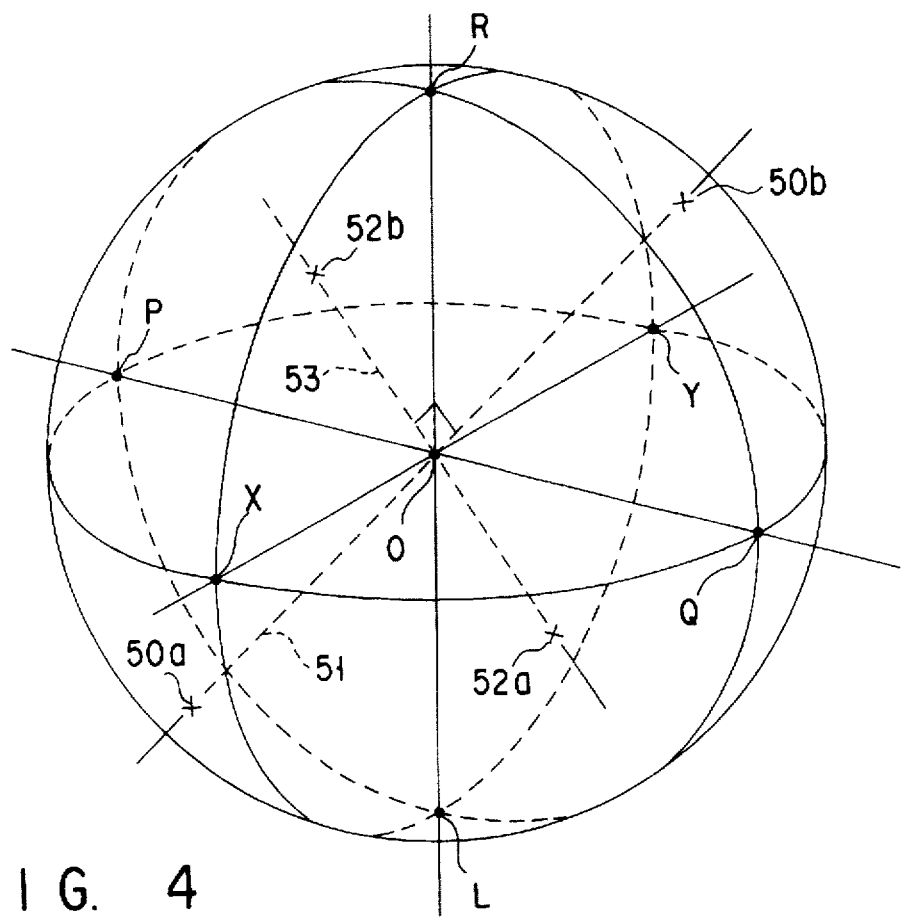
F I G. 4
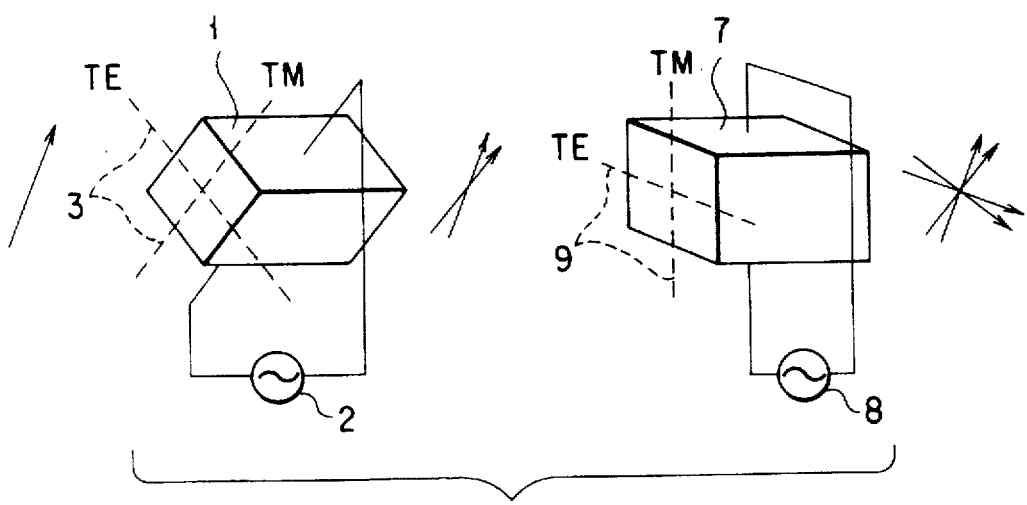
F I G. 5

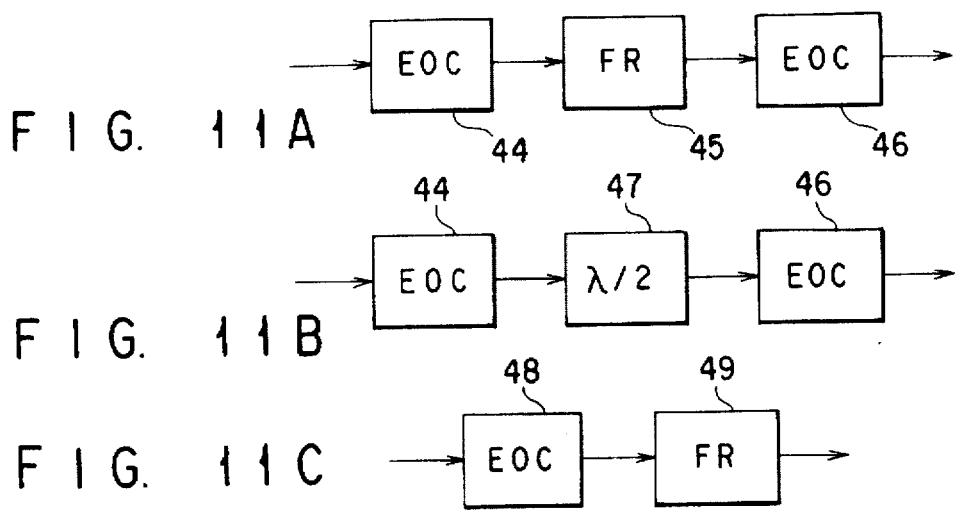
FIG. 11A
FIG. 11B
FIG. 11C
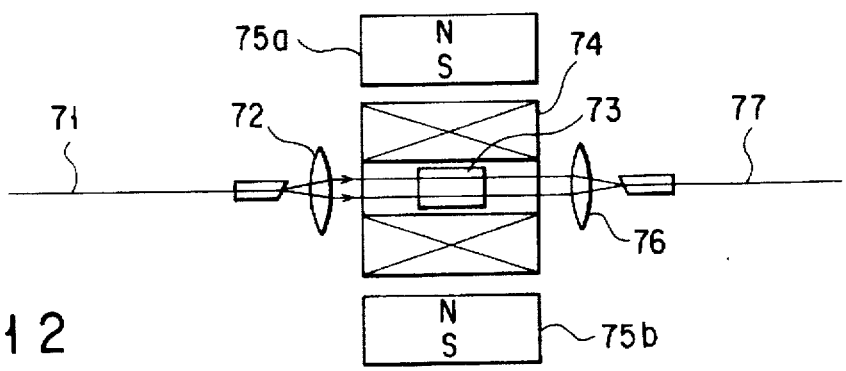
FIG. 12
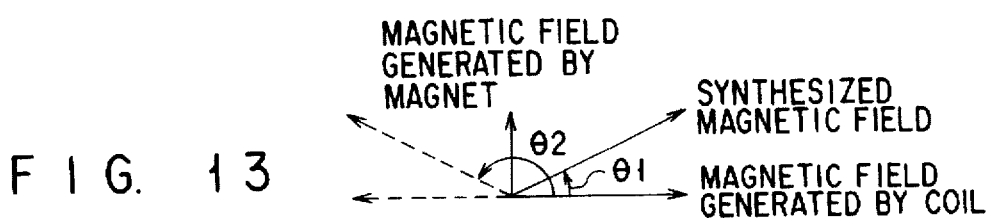
FIG. 13
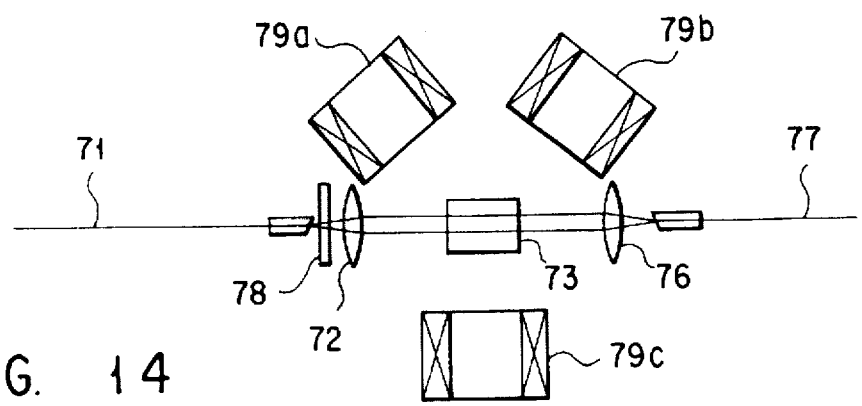
FIG. 14

POLARIZATION CONTROL UNIT

BACKGROUND OF THE INVENTION

1. Field of the Invention

The present invention relates to a polarization control unit for previously scrambling the polarization of optical signals for transmission one long distance optical fiber transmission links.

2. Description of the Related Art

Hitherto, a polarization control unit has been used in coherent optical communications for alignment of the received signal and local oscillator polarization state and in long distance optical transmission systems as a unit for controlling the signal polarization state during transmission in order to prevent signal degradation due to polarization mode dispersion or polarization dependent loss in the transmission system. Moreover, the polarization control unit sometimes is used as a polarization scrambler for reducing signal degradation that may occur in the transmission systems comprising cascaded optical amplifiers, due to polarization mode dispersion, polarization dependent loss and/or polarization hole burning.

Long distance optical fiber transmission passages each forming a link which includes hundreds of erbium-doped optical fiber amplifiers inserted thereto have been employed all over the world. Recently, a report has been made that a large quantity of noise is unintentionally emitted into the polarization state perpendicular to the signal polarization (M. G. Taylor, "Observation of the New Polarization Dependence Effect in Long Haul Optically Amplified System", OFC '93 PD5-1, p291).

According to the report above, a fact that the erbium atom having two excitation densities results in either excitation density transacting one of polarized light beam and another excitation density transacting the polarized light beam perpendicular to the foregoing polarized light beam. That is, if a signal light beam is polarized in such a manner that it greatly transacts one of the excitation states of the erbium atom, the other excitation state is strongly inverted, thus resulting in a large quantity of noise to be emitted.

As described above, the polarization dependency effect of the erbium doped optical fiber amplifier excessively deteriorates signal-to-noise ratio in long distance optical fiber cable transmission. To solve the problem above, the polarization of a signal light beam is required to be scrambled prior to transmitting the signal light beam through the optical fiber cable.

That is, if the signal light beam is scrambled or modulated between the two orthogonal polarization states, the signal light beam is caused to transact the two excitation states. Thus, the excessive inversion can be prevented and, therefore, the quantity of radiated noise can be reduced. As a result, the signal-to-noise ratio can be improved.

FIG. 1 shows the structure of a conventional polarization control unit for scrambling polarized wave. Referring to FIG. 1, reference numeral 1 represents a phase modulator (a polarization dependent phase modulator) which is operated in response to an electric signal supplied from a signal source 2.

In the structure above, when a certain fixed and linearly polarized light beam is made incident upon the phase modulator 1, the phase modulator 1 modulates the relative phase difference between a light beam in a certain polarization mode (which is a TE mode in this case) and a light beam in a mode (which is a TM mode in this case) perpendicular to the TE mode. Then, the signal source 2 generates periodical electric signals, for example, sine wave signals, rectangular signals or pseudo-random signals, to operate the phase modulator 1 with an appropriate amplitude. As a result, a time-average degree of polarization of the signal light beam can be made to be zero.

However, the conventional polarization control unit comprising the polarization dependent phase modulator requires that the incident light is linearly polarized at an angle of 45° relative to the main axis of the phase modulator. However, the actual optical transmission unit involves a fact that the polarization of incident light to be scrambled is not fixed in many cases.

The polarization modulator represented by the polarization dependent phase modulator includes, in the category thereof, a modulator for varying the polarization due to the mechanical operation thereof, a modulator for varying the polarization due to an electrooptical effect and a modulator for varying the polarization by using the Faraday effect.

The mechanical modulator has a problem in that the operation speed is unsatisfactory. A fact has been known that the modulator using the electrooptical effect realized by $LiNbO_3$ suffers from a problem of DC drift. Accordingly, recent polarization modulators are usually structured by using a Faraday device.

Referring to FIG. 2, reference numeral 100 represents a ferromagnetic Faraday device. The Faraday device 100 is applied with a magnetic field in the direction of the optical axis thereof from a coil 101. Light beams transferred through an optical fiber 102 are converted into parallel light beams by a lens 103, and then allowed to pass through the Faraday device 100. Then, a lens 104 converges the parallel light beams into an incident end of an optical fiber 105. When an electric current is allowed to flow in the coil 101, thus, applying a magnetic field to the Faraday device 100 in the direction of the optical axis, polarization of the transmission light can be varied.

However, facts have been known that the foregoing structure comprising the ferromagnetic Faraday device involves that light scatters excessively in the unsaturated region and also the polarization extinction ratio deteriorates. Hence, if the polarization of the light is varied by means of the Faraday device 100 and the coil 101 as shown in FIG. 2, the output optical intensity will change and the extinction ratio will deteriorate. In accordance with results of experiments, an excessive change in the output intensity reaching 30% was observed in a case when the single mode optical fiber was used. What is worse, a fact was found that repeatability of the polarization state is unsatisfactory.

SUMMARY OF THE INVENTION

As described above, the conventional polarization control unit requires the state of polarization of incident light to be known and fixed. However, an actual light transmission unit usually encounters a fact that the polarization of incident light to be scrambled is not fixed.

In particular, the conventional polarization control unit comprising the Faraday device suffers from change in the loss, deterioration in the extinction ratio and unsatisfactory repeatability. Therefore, the bit error rate at the receiver changes unintentionally. What is worse, the conventional unit having poor repeatability involves a problem in that the state of polarization cannot intrinsically be controlled. In the case where a polarization scrambler is formed by using the conventional polarization control unit, change in the loss and the remaining degree of polarization of the polarization scrambler deteriorates. Thus, there arises a problem in that the effectiveness of the polarization scrambler excessively deteriorates.

An object of the present invention is to provide a polarization control unit capable of performing a scrambling process regardless of the state of polarization of incident light, free from change in the loss and deterioration in the extinction ratio and exhibiting satisfactory repeatability of the state of polarization.

According to a first aspect of the present invention, there is provided a polarization control unit comprising:

a Faraday device for rotating the state of polarization of incident parallel light beams by an amount corresponding to the direction of the magnetic field applied;

magnetic field forming means respectively disposed near the Faraday device, arranged to apply, to the Faraday device, magnetic fields from a plurality of directions and to generate a synthesized magnetic field, the direction of which in the direction of the optical axis is changed in response to a drive signal; and a signal source for generating the drive signal.

According to a second aspect of the present invention, there is provided a polarization control unit comprising a first Faraday device, a second Faraday device and a ¼ wavelength plate disposed between the two Faraday devices and arranged such that AC magnetic fields or rotational magnetic fields having different frequencies are applied to the first and second Faraday devices so as to scramble polarization of incident light, wherein the ¼ wavelength plate is inclined with respect to the incident optical axis in such a manner that a remaining degree of polarization of the polarization scrambler can be minimized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a perspective view showing a Poincare sphere for explaining the principle of the operation when the polarization control unit is operated to perform scrambling of polarization;

FIG. 4 is a perspective view showing a Poincare sphere for explaining the principle of the operation when the polarization control unit is operated to perform scrambling of polarization;

FIG. 5 is a perspective view showing the structure of a polarization control unit according to a first embodiment;

FIGS. 11A, 11B and 11C are block diagrams showing other structures of the polarization control unit;

FIG. 12 is a cross sectional view showing the structure of the polarization control unit according to a first embodiment of the present invention;

FIG. 13 is a vector diagram showing the principle of the operation of the first embodiment;

FIG. 14 is a cross sectional view showing the structure of the polarization control unit according to a second embodiment of the present invention;

DETAILED DESCRIPTION OF THE PREFERRED EMBODIMENTS

Figure 1:
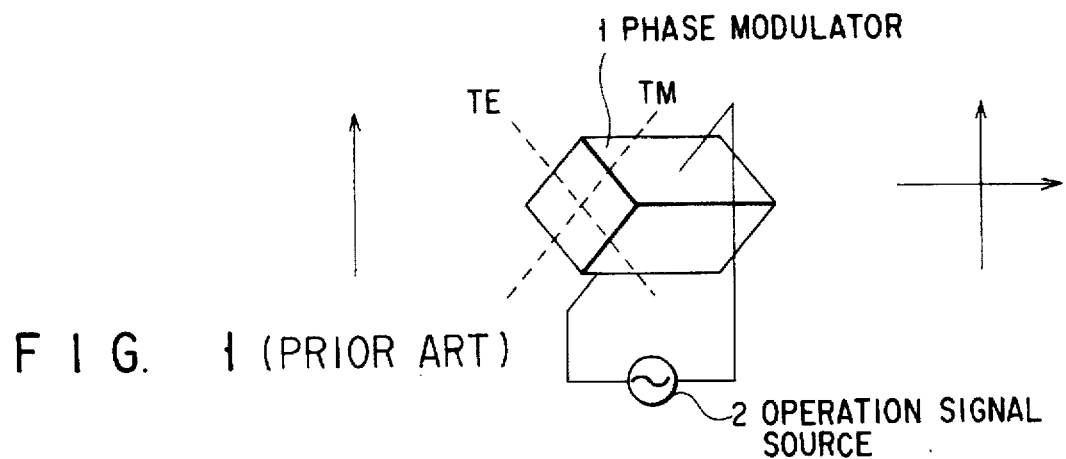
FIG. 1 is a perspective view showing the structure of a conventional polarization control unit having a polarization dependent phase modulator.
Figure 2:
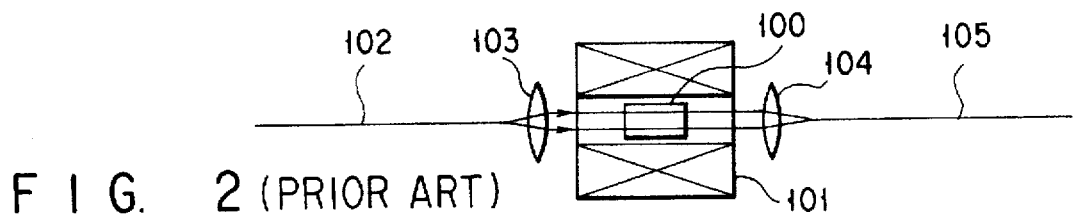
FIG. 2 is a cross sectional view showing the structure of a conventional polarization control unit employing a Faraday device.

Initially, a basic principle of the operation for scrambling polarization by using a polarization control unit will now be described prior to describing preferred embodiments of the present invention.

Initially, first and second polarization dependent phase modulators (hereinafter simply called "phase modulators") are serially disposed in a state where their optical axes are relatively inclined by an angle of 45°. Then, each of the phase modulators is operated independently in such a manner that the time-average degree of polarization of respective output light beams is made to be zero without dependency upon the state of the input polarization.

A portion of the incident polarization is scrambled by the first phase modulator, while a portion, which has not been scrambled by the first phase modulator, is scrambled by the second phase modulator. If the input polarization is not scrambled by the first phase modulator, the second phase modulator performs scrambling in such a manner that the degree of polarization is made to be zero.

FIG. 3 shows a Poincare sphere for explaining the foregoing principle. Referring to FIG. 3, straight lines respectively passing through points L and R, points P and Q and points X and Y on the surface of the sphere are reference axes mutually perpendicular at original point O. Each of points L, R, P, Q, X and Y are located at an equal distance from the original point O. The point R (the north pole), point L (the south pole) and points P, Q, X and Y on the equator of the sphere indicate the following:

R: clockwise circular polarization
L: counterclockwise circular polarization
P: linear polarization making an inclination angle of +45°
Q: linear polarization making an inclination angle of −45°
X: horizontal polarization
Y: vertical polarization An assumption is performed here that point R is called the north pole, point L is called a south pole and a circle passing through points P, Q, X and Y is called the equator.

The foregoing is applied to the Poincare sphere to be described later.

In the Poincare sphere above, an assumption is performed that first optical axis S1 of the first phase modulator, which is operated in response to an electric signal having frequency f1 and second optical axis S2 perpendicular to the first optical axis S1 respectively are expressed by straight lines 55 and 56 which connect points a and b on the equator and the original point O. At this time, points a and b are positioned symmetrically with each other with respect to the original point O.

Arbitrary incident polarization 54 is rotated around the first optical axis S1 due to the modulation performed by the first phase modulator so as to draw a trace 59. If the modulation amplitude is an appropriate amplitude, time-average residual polarization, as indicated by reference numeral 60, exists in the same direction as a straight line connecting the two optical axes S1 and S2 of the first phase modulator in the Poincare sphere.

The time-average residual polarization 60 is modulated by the second phase modulator having the axis inclined by 45° from the first phase modulator. Since the actual inclination of the optical axis of 45° can be expressed by the difference of 90° in the Poincare sphere expression, the first and second optical axes S3 and S4 of the second phase modulator and the first phase modulator, which are operated in response to the electric signal having the frequency f2, can be expressed by straight lines 57 and 58 connecting points c and d on the equator and the original point O. At this time, points c and d are positioned symmetrically with each other with respect to the original point O.

When the residual polarization 60 generated due to the first phase modulator is modulated by the second phase modulator, a trace 61 is drawn. If the modulation amplitude is appropriate amplitude, the time average exists in the center of the sphere. Thus, the degree of polarization can be made to be zero.

Globally, as can be understood from the Poincare sphere shown in FIG. 4, by disposing the two polarization modulators in such a manner that a straight line 51 connecting points 50a and 50b on the spherical surface expressing two main and perpendicular axes of a certain polarization modulator (not limiting to the polarization dependent phase modulator but a modulator capable of modulating polarization) and a straight line 53 connecting points 52a and 52b on the spherical surface expressing two main and perpendicular axes of another polarization modulator make an angle of 90°, the degree of polarization can be made to be zero (the two perpendicular polarized waves are, on the Poincare sphere, expressed by two opposite points with respect to the center of the sphere). The foregoing fact is a first characteristic.

As an alternative to this, a polarization conversion device, such as a wavelength plate, is interposed between two polarization modulators and the angle of a straight line connecting two points on the surface of the sphere expressing two perpendicular and main axes of either of the polarization modulators is converted by the polarization conversion device to make an angle of 90° from a line connecting two points on the surface of the sphere expressing two perpendicular and main axes of another polarization modulator. The foregoing structure attains a similar effect. The foregoing structure is a second characteristic.

To completely scramble the incident light beam, the two polarization modulators are operated with electric signals having the same frequency (however, the two polarization modulators are operated in such a manner that their phases are shifted by 90° from each other) or respectively having different frequencies. If the frequencies are the same, the traces of the modulation of polarization are limited to a small range on the Poincare sphere and, thus, the degree of polarization unintentionally depends upon the incident polarization and the same remains except a case where the phase shift is 90°. The foregoing fact is a third characteristic.

Note that the polarization modulator is not required to have the main axis which always correspond to the linear polarization. That is, if two polarization modulators satisfy the foregoing relationship, any polarization modulator can be applied to the unit according to the present invention regardless of the main axis thereof.

For example, the Faraday device is a polarization modulator having a main axis with respect to a circular polarization and arranged to modulate the phase difference between the counterclockwise circular polarization and the clockwise circular polarization. On the other hand, a polarization dependent phase modulator, structured to operate electrooptical crystal with voltage, has a main axis with respect to a certain linear polarization and another perpendicular linear polarization. The foregoing modulators can be applied to the present invention. Similarly, a polarization modulator of a type having main axes, which are two perpendicular elliptic polarized light beams, may be applied to the unit according to the present invention if it is developed.

Referring to FIGS. 5 to 11, a specific example of the unit according to the present invention will now be described.

FIG. 5 shows a polarization control unit according to a first embodiment as shown in FIG. 5, first and second polarization dependent phase modulators 1 and 7 are optically serially connected in such a manner that their axes are relatively inclined by an angle of 45°. The first phase modulator 1 is driven by an electric signal generated by a first drive signal source 2, while the second modulator 7 is driven by an electric signal generated by a second drive signal source 8.

Each of the polarization dependent phase modulators 1 and 7 is made of a substance capable of modulating the refractivity in a specific direction. For example, they may be made of electrooptical crystal, such as lithium niobate or lithium tantalum. Also liquid crystal may be employed. As an alternative to this, they may be realized by mechanical deformation such that pressure is applied to an optical fiber by an actuator or an optical fiber is pulled.

By using the electrooptical crystal, the refractivity can be controlled by changing the voltage to be applied. Since an excellent response speed can be realized, the modulation can relatively easily be performed at high speed. Although the liquid crystal has a problem of unsatisfactory response speed, the modulation can be performed with a relatively low voltage level. Although the method, in which the optical fiber is mechanically deformed, suffers from low response speed, the system can be formed by the connection of optical fibers only. Therefore, optical loss can be reduced.

The description will be performed about the electrooptical crystal and, in particular, about lithium niobate. Since the lithium niobate enables the modulation to be performed at high speed and has a large electrooptical constant, it can be operated with relatively low drive voltage.

A polarization component among the polarization components of incident light that does not run in the axial direction of the first phase modulator 1 is scrambled by the first phase modulator 1, while polarization components left in the axial direction of the first phase modulator 1 is scrambled by the second phase modulator 7.

To completely scramble the incident light beam, the two phase modulators are needed to satisfy (a) the two phase modulators are driven with electric signals having the same frequency and the phases which are shifted by 90° from each other; or (b) the two phase modulators are driven with two electric signals having different frequencies. The reason for this will now be described. If the same frequency is employed to operate the two phase modulators, the traces of the polarization modulation are limited in a small range on the Poincare sphere. In particular, the degree of polarization depends upon the incident polarization except the case where the phase shift is 90° and, thus, the degree of polarization remains.

Although the operation method (a) has an advantage that only one signal source (an oscillator) is required to modulate and operate the two modulators, a circuit for making the phase difference between the two frequencies to be 90° is required. Although the operation method (b) is needed to have two signal sources (oscillators), the circuit for making the phase difference between the two frequencies can be omitted.

In the case where the operation waveform is the identical rectangular wave, an amplitude is required which is sufficient to cause the phase of the peak-to-peak operation signal to be different by 180°. In the case of the sine wave, the time-average degree of polarization can be made to be zero by employing an operating amplitude of peak-to-peak corresponding to 275° which is somewhat larger than the degree required in the case of the rectangular wave. When the rectangular wave is employed, the required operation voltage can be lowered. Since the band for the operation circuit can be narrowed, the structure can relatively be simplified.

Figures 6, 7, 8:
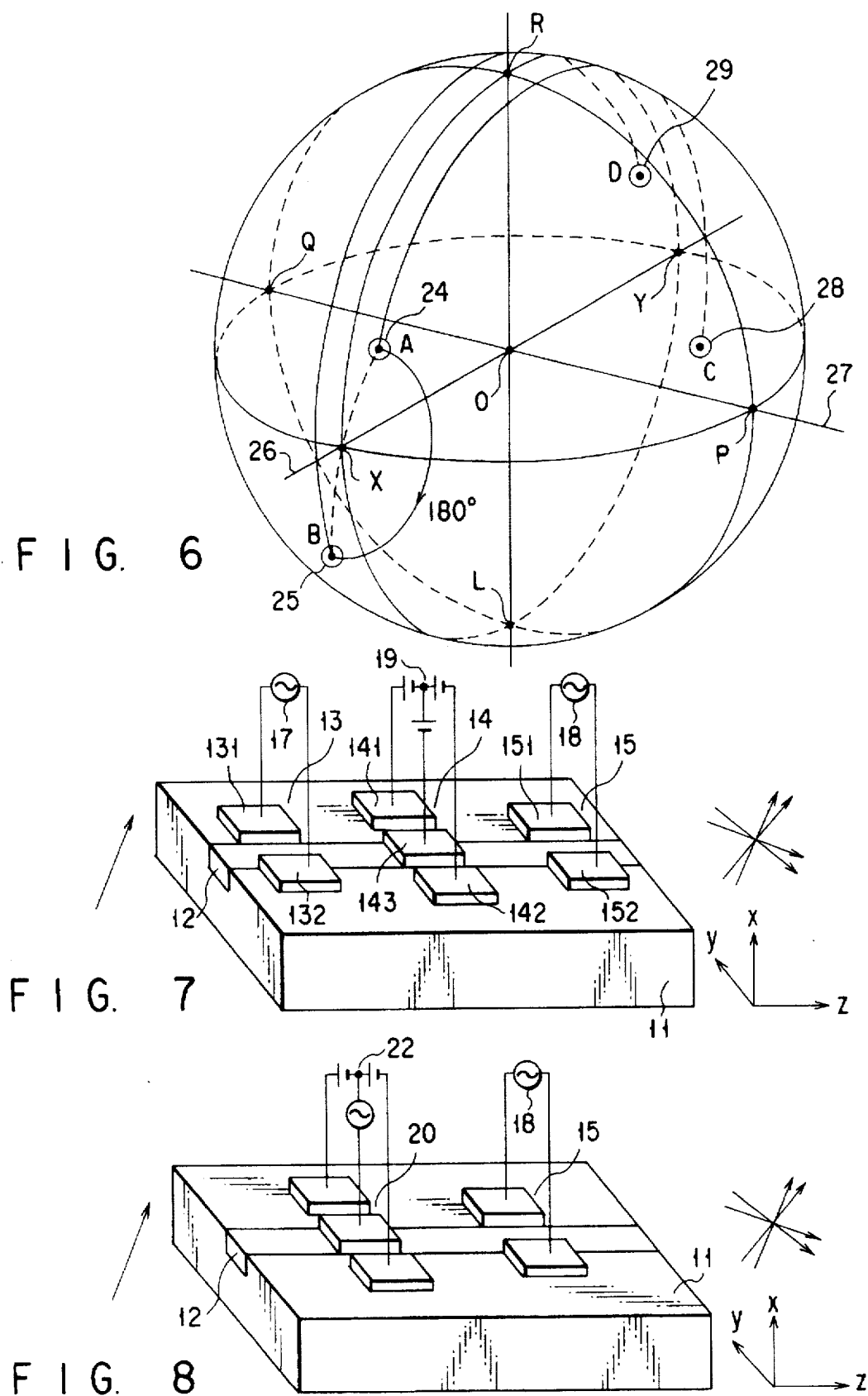
FIG. 6 is a perspective view showing the Poincare sphere for explaining the process of change of arbitrarily polarized incident light through the polarization control unit having the structure shown in FIG. 5.
FIG. 7 is a perspective view showing the structure of the polarization control unit according to a second embodiment.
FIG. 8 is a perspective view showing the structure of the polarization control unit according to a third embodiment.

FIG. 6 is a diagram showing the Poincare sphere for explaining the process of change of an arbitrarily polarized input light beam when the input light beam is allowed to pass through the polarization control unit having the foregoing structure. Referring to FIG. 6, assumptions are performed that a polarized wave 24 as indicated by point A has been input and that the first and second phase modulators 1 and 7 have been operated with rectangular waves. Another assumption is performed that the peak-to-peak modulation amplitude is able to cause the phase difference of 180° to be made between the polarized waves in the directions of the main axes of the modulators 1 and 7.

The polarized wave 24 at the point A is, by the first phase modulator 1, converted into polarized wave 25 at point B having the same ellipticity as that of the polarized wave 24 at the point A, rotated in the opposite direction to that of polarized wave 24, and the major axis of the ellipse which is directed in a direction of a line symmetry with respect to the main axis of the first phase modulator 1. The foregoing conversion is expressed on the Poincare sphere by rotating the point A by 180° relative to the main axis 26 of the first phase modulator 1.

Therefore, the phase of the incident light beam is modulated by the first phase modulator 1 so that its polarization is alternately switched between the points A and B, and then transferred to the second phase modulator 7. An optical axis 27 of the second phase modulator 7 is shifted from the optical axis 26 of the first phase modulator 1 by 45° (which is 90° on the Poincare sphere). Therefore, the polarized wave 24 at the point A is modulated by the second phase modulator 7 so as to be alternately switched between A (the polarized wave 24) and C (the polarized wave 28), while the polarized wave 28 at the point B is modulated by the second phase modulator 7 so as to be alternately switched between B (the polarized wave 28) and D (the polarized wave 29). The time-average degree of polarization of each of the four polarized waves 26 to 29 is zero.

The first phase modulator 1 or the second phase modulator 7 may be manufactured by, for example, a method comprising the steps of cutting crystal of lithium niobate in such a manner that its anisotropic axis (the z axis) is made to be the direction in which light is transmitted and forming an electrode in such a manner that an electric field can be applied to the direction of the y axis perpendicular to the z axis.

In comparison to a method for integrating the structure to be described later, the method using crystal on the bulk is advantageous in that manufacturing can be performed easily and the connection with the input and output optical fibers can relatively easily be performed. On the other hand, the integration of the unit enables the insertion loss for the overall unit to be reduced. In particular, it has an advantage that the voltage required to perform the modulation can be lowered by employing a wave guide structure. However, optical wave guide passages having different crystal axes cannot easily directly be integrated on the same substrate. Second and third embodiments capable of improving the foregoing problem are shown in FIGS. 7 and 8.

FIG. 7 shows a structure in which the overall polarization control unit is integrated on one substrate. An optical wave guide passage 12 is formed in the z direction on an x-cut lithium niobate substrate 11. Moreover, a first phase modulator 13, a 3 dB TE-TM polarization mode converter 14 and a second phase modulator 15 having the same axial direction as that of the first phase modulator 13 are sequentially disposed along the optical wave guide passage 12.

The first phase modulator 13 has a pair of electrodes 131 and 132 disposed at the two light beam input ends of the optical wave guide passage 12 so as to be driven by a first signal source 17. The second phase modulator 15 has a pair of electrodes 151 and 152 disposed on the two sides of the light output ends of the optical wave guide passage 12 so as to be driven by a second signal source 18. The 3 dB TE-TM polarization mode converter 14 has electrodes 141, 142 and 143 disposed between the first and second phase modulators 13 and 15, the electrodes 141, 142 and 143 being disposed on the two sides and above the optical wave guide passage 12 so as to be operated with constant DC voltage supplied from a constant voltage source 19.

That is, the polarization control unit having the foregoing structure is not formed such that optical wave guide passages having different crystal axes are directly integrated on the same substrate. As an alternative to this, the 3 dB TE-TM polarization mode converter 14 is inserted between the phase modulators 13 and 15 formed in the same axial direction while forming respective electrodes 141, 142 and 143 on the substrate 11 so as to be applied with constant-voltage operation signal. As a result, the 3 dB TE-TM polarization mode converter 14 is able to perform polarization mode conversion equivalent to a ¼ wavelength plate having an axis inclined on the xy plane by 45° from the y direction.

Therefore, when a linearly polarized light beam 4 is made incident, a polarization scrambling process similar to a Faraday device, to be described later, can be performed so that a light beam 10, the polarization of which is changed any time, is transmitted.

As can be understood as a result of a comparison with the structure shown in FIG. 7, the polarization control unit shown in FIG. 8 has a structure such that the first phase modulator and the 3 dB TE-TM polarization mode converter are replaced by a TE-TM polarization mode converter 20 formed on the x-cut lithium niobate substrate 11 having the optical wave guide passage 12 formed in the z direction. The TE-TM polarization mode converter 20 can be controlled electrically.

The TE-TM polarization mode converter 20 is supplied with periodical modulation signals supplied from the operation signal source 22 in such a manner that an electric field is applied in the x direction relative to the connection point of TE/TM, that is, the bias point at which the propagation constant in the TE mode and that in the TM mode are the same. As a result of the foregoing modulation method, the TE-TM polarization mode converter 20 performs an operation similar to a polarization dependent phase modulator having an axis inclined in the xy plane by 45° from the y direction.

Therefore, the polarization scrambling process can be performed by one TE-TM polarization mode converter capable of performing modulation and one phase modulator. Thus, the required number of elements can be reduced as compared with the structure shown in FIG. 7.

As a result of the foregoing integration method, the labor for sequentially connecting the devices can be saved though an issue of establishing the connection with the transmission passage fiber remains to be solved.

The unit according to the present invention may use a Faraday effect. The Faraday effect can be obtained from, for example, crystal such as YIG (Yttrium Iron Garnet). When a light beam is allowed to pass through the material applied with a magnetic field in the same direction as the direction of the light propagation, the direction of the light polarization is rotated. The foregoing effect is frequently employed in an optical isolator.

A polarization control unit according to a fourth embodiment shown in FIG. 9 comprises first and second Faraday-effect polarization modulators (hereinafter simply called "polarization modulators") 30 and 32 and a ¼ wavelength plate 31 serially interposed between the polarization modulators 30 and 32.

The first polarization modulator 30 is in the form of a coil 303 in which a cylindrical Faraday device 301 is inserted into a bobbin 302 and an electrically conductive wire is wound around the bobbin 302. When an electric current is allowed to pass through the coil 303 from an operation signal source 33, the internal Faraday device 301 is applied with a magnetic field. Thus, the rotational angle of polarization of transmission light through the Faraday device 301 can be determined. Also the second polarization modulator 32 has the same structure as that of the first polarization modulator 30 and comprises a Faraday device 321, a bobbin 322 and a coil 323 so as to be capable of determining the rotational angle of polarization of transmission light through the Faraday device 321 when an electric current is allowed to pass through the coil 323 from the operation signal source 34.

A structure comprising one polarization modulator having the Faraday device is considered. When linear polarized light is supplied, the supplied light beam is modulated with a periodical signal, such as a rectangular wave, a sine wave or a pseudo random signal, having an appropriate frequency and amplitude, so as to be scrambled. Thus, the time average of the degree of polarization of light to be emitted from the polarization modulator is made to be zero.

However, the foregoing structure cannot perform scrambling in a case where circularly polarized wave is input. To scramble the circularly polarized wave, light is required to be converted into linearly polarized light before light passes through the Faraday device. The conversion can be performed by a ¼ wavelength plate.

Figure 9:
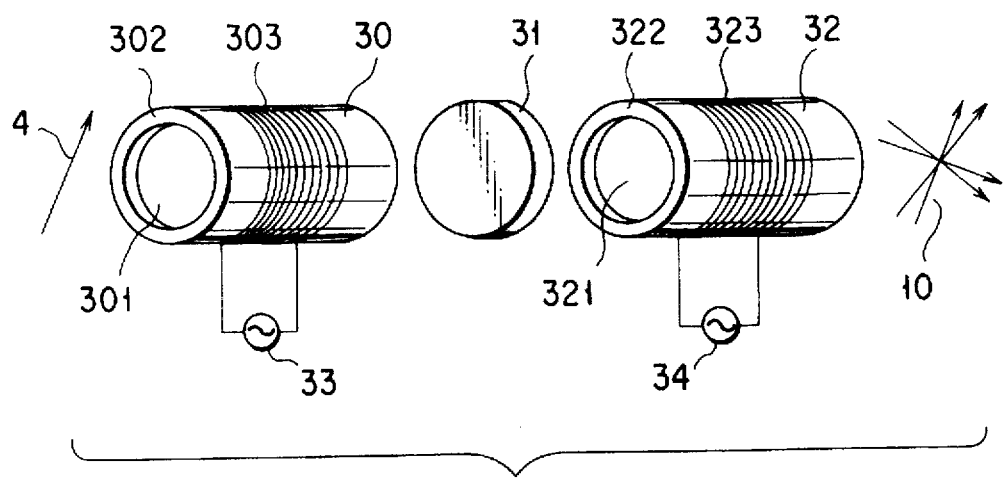
FIG. 9 is a perspective view showing the structure of the polarization control unit according to a fourth embodiment.

As a result, a polarization scrambling unit capable of scrambling light regardless of the state of the light can be realized by using two polarization modulators 30 and 32, as shown in FIG. 9. The polarization modulators 30 and 32 are serially connected to each other through a ¼ wavelength plate 31. The linearly polarized wave component of incident light 4 is scrambled by the first polarization modulator 30, while the circularly polarized wave component allowed to pass through the first polarization modulator 30 is converted into a linearly polarized wave component by the ¼ wavelength plate 31, and then scrambled by the second polarization modulator 32 so that output light beam 10 is obtained.

To completely scramble the polarization state of the transmission light beam 10, coils 303 and 323 of the polarization modulators 30 and 32 are, as described above, required to be operated with (a) the same frequencies (however, the phases of which are shifted from each other by 90°) or (b) two different frequencies.

Figure 10:
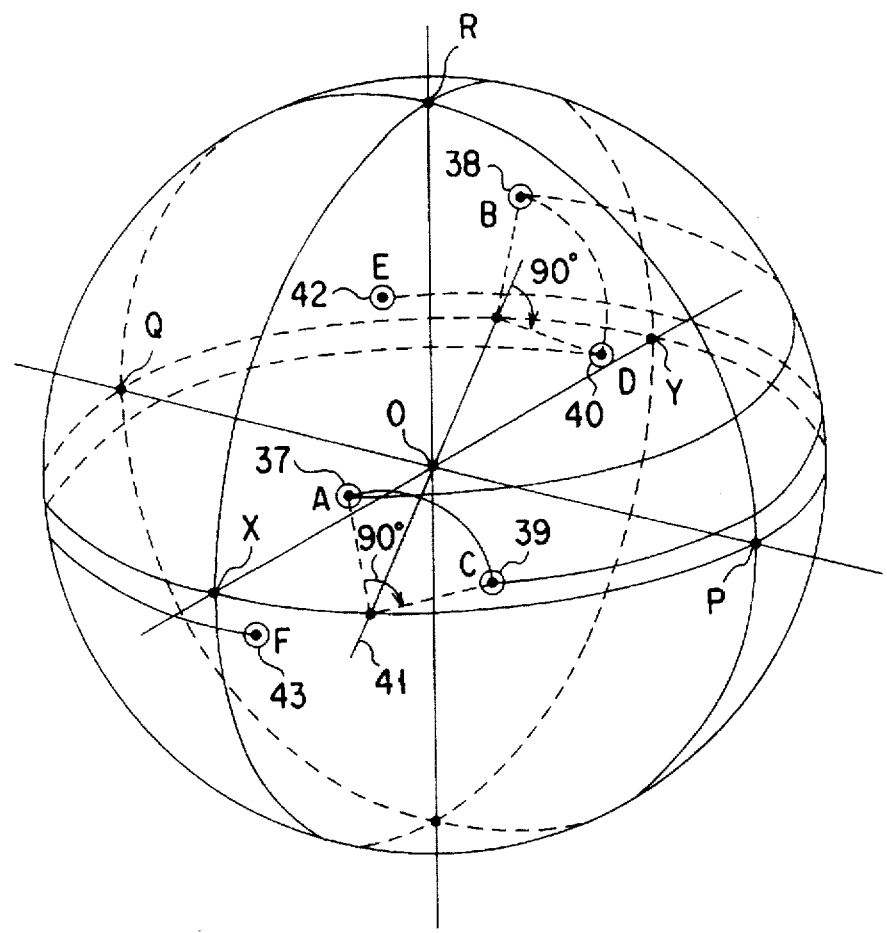
FIG. 10 is a perspective view showing the Poincare sphere for explaining the process of change of arbitrarily polarized incident light through the polarization control unit having the structure according to the embodiment shown in FIG. 9.

The process of change of arbitrarily polarized input light through the foregoing polarization control unit will now be described with reference to a Poincare sphere shown in FIG. 10.

Assumptions are made that polarized wave 37 as indicated by point A is input, that the polarization modulators 30 and 32 are operated with rectangular waves and that the modulation amplitude is determined to rotate the polarized wave by 90° in the peak-to-peak range.

The polarized wave at point A is, by the first polarization modulator 30, converted into polarized wave 38 at point B in the form in which the major axis of the ellipse at the point A is rotated by 90°. The foregoing conversion can be, on the Poincare sphere, expressed by rotating the point A by 180° relative to a line connecting the south pole and the north pole of the sphere. Therefore, the polarization of light passing through the first polarization modulator 30 is alternately switched between the point A and the point B.

The output light beam from the first polarization modulator 30 is allowed to pass through the ¼ wavelength plate 31. The ¼ wavelength plate 31 has a function of rotating the polarized wave on the Poincare sphere by 90° relative to a main axis 41 of the ¼ wavelength plate 31. Therefore, each of the polarized waves 37 and 38 at the points A and B respectively are converted into polarized waves 39 and 40 at points C and D.

The light beam allowed to pass through the ¼ wavelength plate 31 is made incident upon the second polarization modulator 32. The second polarization modulator 32 is arranged to operate similarly to the first polarization modulator 30. Therefore, the polarized wave 39 at the point C is alternately switched with polarized wave 42 at point E, while the polarized wave 40 at the point D is alternately switched with polarized wave 43 at point F. As can be understood from FIG. 10, the time-average degree of polarization of each of the four polarized waves 39, 40, 42 and 43 at the points C, D, E and F is zero.

In addition to the foregoing example, structures respectively Shown in FIGS. 11A, 11B and 11C enable polarization control units to be realized which do not depend upon the incident polarization. The devices are connected to one another by light beam connection method to prevent change in the state of polarization. The schematic structure of each unit will now be described.

The unit shown in FIG. 11A has a structure such that two polarization dependent phase modulators (for example, electrooptical crystal devices (EOC)) 44 and 46 each having the main axis in the direction of the linearly polarized light are serially connected in such a manner that their main axes run in the same direction (or vertical directions). Moreover, a Faraday device (FR) 45 for performing a fixedly polarization rotation of 45° is inserted into the polarization dependent phase modulators 44 and 46.

As a result of the structure above, by only placing the two electrooptical crystal devices 44 and 46, each of which is formed into a prism shape obtained by cutting while considering the crystal axis as shown in FIG. 8, on a flat plate or a frame, the directions of the optical axes of the two devices can be aligned. Since the Faraday device 45 is simply required to be serially inserted between the electrooptical crystal devices 44 and 46, the elements can significantly easily be assembled.

Since a Faraday device of a type having a fixed polarization rotational angle of 45° is also used in an optical isolator, it is available easily. Moreover, since a saturated region for the Faraday rotation is used, another advantage can be realized in that stable characteristics can be obtained.

The unit shown in FIG. 11B has a structure such that two polarization dependent phase modulators (EOC)) 44 and 46 each having the main axis which is the linearly polarized light are serially connected in such a manner that their main axes run the same direction (or vertical directions). A ½ wavelength plate (λ/2) 47 having, in a plane perpendicular to the light propagation direction, an axis in a direction of 22.5° from the main axis of the polarization dependent phase modulator 44 or 46 is serially inserted between the two polarization dependent phase modulators 44 and 46.

A variation of this has an advantage that adjustment of the direction of the axis of the ½ wavelength plate 47 enables scrambling to be performed even if the axes of the two polarization dependent phase modulators 44 and 46 having the main axis of each of which is the linearly polarized light.

The wavelength plate 47 is not required to be ½ wavelength. If it is from ¼ to ¾ wavelength, the required conditions can be satisfied.

FIG. 11C shows a unit having a structure such that a polarization dependent phase modulator (EOC) 48 having a main axis which is the linearly polarized light and a Faraday-effect polarization modulator (FR) 49 are serially connected to each other. The foregoing method requires only two devices and the devices are required to be simply disposed regardless of the direction of the axes. Thus, unit can easily be assembled.

Each of the foregoing polarization control units is able to perform the scrambling process regardless of the polarization state of the incident light beam.

The present invention is established while paying attention to the polarization control unit of a type comprising the Faraday device.

As described above, the polarization control unit comprising the Faraday device encounters a problem of the change in the loss, deterioration in the extinction ratio and repeatability. When the scrambling process is performed, the change in the loss and the remaining degree of polarization deteriorate. Thus, the effectiveness as a polarization scrambler excessively deteriorates.

Accordingly, the polarization control unit according to the present invention comprises a magnetic field forming means provided for applying a magnetic field to a Faraday device made of a ferromagnetic material for receiving parallel light beams to attain the Faraday effect in order to cause the amount of the Faraday rotation to arbitrarily be changed.

In the polarization control unit having the foregoing structure, when parallel light beams are allowed to pass through the ferromagnetic Faraday device to attain the Faraday effect, the magnetic field forming means applies, to the Faraday device, a rotational magnetic field for example so that the state of polarization is modulated.

In particular, the Faraday device is characterized in that it is formed by an epitaxial grown film except the vertically anisotropic film. Specifically, the Faraday device is manufactured by subjecting an epitaxial grown film made of $(RBi)_3(FeGaAl)_5O_{12}$ (R is at least one rare earth element selected from a group consisting of gadolinium (Gd), terbium (Tb), holmium (Ho) and ytterbium (Yb)) to heat treatment at 900° C. to 1200° for one hour or longer.

The composition of $(RBi)_3(FeGaAl)_5O_{12}$ is appropriately adjusted in such a manner that the saturated flux density (4 πMs) is 500 Gauss or lower and the Faraday rotational angle θf is 45°/cm with the employed wavelength.

The rotational magnetic field can be formed by another method in which a constant magnetic field is applied to a direction perpendicular to the parallel light beams and a magnetic field, the intensity of which is changed in the direction of the parallel light beams, is added.

It is preferable that the rotational magnetic field be a saturated magnetic field. That is, the parallel light beams in the ferromagnetic Faraday device pass through a plurality of magnetic domains. Since the magnetic domains are not aligned into one direction in unsaturated regions, the parallel light beams are Faraday-rotated to different extents depending upon the positions. Thus, the polarization extinction ratio deteriorates and light scatters at the interface between the magnetic domains. Since also the spatial coherency deteriorates, the connection with a single mode optical fiber deteriorates. It can be considered that it causes the loss to be changed. What is worse, the magnetic domains have different sizes and are unstable because the shape and the direction of the magnetic domain are unintentionally changed due to influences of temperature, external pressure and adjacent magnetic domains. Thus, it can be considered that the repeatability of the amount of the Faraday rotation is unsatisfactory.

Accordingly, the polarization control unit according to the present invention comprises the ferromagnetic Faraday device which is used in the saturated region so that the directions of the magnetic domains are aligned. The amount of the Faraday rotation is not changed by changing the intensity of the magnetic field but the same is changed by changing the direction of the magnetic field. That is, the Faraday rotation amount $\phi$ in a unsaturated region is generally expressed by Equation (1):

$$\phi = VHl \cos \theta \qquad (1)$$

where V is a Verdet's constant, H is the intensity of the magnetic field, l is the length of the Faraday device and $\theta$ is an angle made between the optical axis and the magnetic field. In the present invention, H is intensified to a level near the saturated level and $\phi$ is changed by changing $\theta$.

Since the directions of all magnetic domains are aligned in this case, the light beam is not Faraday-rotated to different extents depending upon the positions. Thus, the extinction ratio does not deteriorate. Moreover, light does not scatter at the interface between the magnetic domains and the spatial coherency does not deteriorate. Thus, the efficiency in the connection with a single-mode optical fiber is stable. Thus, the loss change can significantly be reduced. Since the directions of the magnetic fields are stable, repeatability of the amount of the Faraday rotation can be attained.

FIG. 12 shows a first embodiment of the polarization control unit according to the present invention. Optical fibers 71 and 77 are polarization maintaining fibers, the optical fiber 71 being an optical fiber through which linearly polarized light is transmitted. To reduce reflected light, the leading ends of the optical fibers 71 and 77 are polished diagonally. Light beams emitted from the optical fiber 71 are converted into parallel light beams by a lens 72, and then allowed to pass through a Faraday device 73 so as to be converged to the incident end of the optical fiber 77 by a lens 76. The Faraday device 73 is applied with a magnetic field in the direction of the optical axis by a coil 74 and applied with another magnetic field perpendicular to the optical axis by a pair of magnets 75a and 75b.

The principle of operation of the unit having the foregoing structure will now be described with reference to FIG. 13.

FIG. 13 shows a state of each magnetic field to be applied to the Faraday device 73. As can be understood from FIG. 13, a synthetic magnetic field exists in a direction inclined from the optical axis (the direction of the magnetic field formed by the coil 74) by an angular degree of $\theta 1$. An assumption is made that an electric current to be supplied to the coil 74 is I. By reversing the direction of the electric current to be supplied to the coil 74 in the foregoing state, the direction can be changed to a direction $\theta 2$ indicated by a dashed line. That is, when the electric current flowing in the coil 74 is changed from I to $-I$, the direction of the magnetic field can be changed from $\theta 1$ to $\theta 2$.

The Faraday device 73 has little anisotropy and is saturated with the intensities of the magnetic fields generated by the magnets 75a and 75b. Since the Faraday device 73 has been saturated in all states, the amount of the Faraday rotation does not depend upon the change in the intensity of the synthetic magnetic field and the same depends upon only the change in the direction of the magnetic field. Therefore, the amount of the Faraday rotation is in proportion to only $\cos \phi$.

In general, the garnet film of the epitaxial-grown $(RBi)_3(FeGaAl)_5O_{12}$ has a vertical anisotropy which is needed to be reduced to use the garnet film as a Faraday device.

The anisotropy can effectively be reduced by heat treatment. For example, an epitaxial-grown film of $(RBi)_3(FeGaAl)_5O_{12}$ which is saturated with a small magnetic field intensity is required to be subjected to heat treatment at about 1100° C. (900° C. to 1200° C.) for 1 hour or longer (about 20 hours). Since a film containing Bi is evaporated at 1200° C. or higher, excessively high temperature results in the film being decomposed and, thus, the Faraday rotation performance cannot be realized. If the temperature is 900° C. or lower, the reduction in the anisotropy takes 1000 hours or longer which is too long for practical use.

The heat treatment is needed to be performed in a state where a monocrystal substrate, such as GGG $(Gd_3Ga_5O_{12})$, has been removed. Then, a plurality of garnet films subjected to the heat treatment are stacked and bonded to one another to realize a required thickness to use the same as the Faraday device.

As described above, according to the foregoing structure, the loss change and deterioration in the extinction ratio can be prevented and, thus, a polarization control unit exhibiting excellent repeatability can be realized.

FIG. 14 shows the structure of a polarization control unit according to a second embodiment of the present invention. Note that elements shown in FIG. 14 which are the same as those shown in FIG. 12 are given the same reference numerals and the same elements are omitted from the description.

The polarization control unit according to this embodiment has the Faraday device 73 and three coils 79a, 79b and 79c which are disposed around the Faraday device 73 to be able to apply magnetic fields to the Faraday device 73 from different angles. By adjusting each electric currents to be applied to each of the coils 79a, 79b and 79c, a magnetic field in an arbitrary direction can be obtained.

In the first embodiment in which infinite electric current needs to flow in the coil 74 to generate a magnetic field extending parallel to the optical axis, the Faraday rotation cannot assume a sine-wave shape. With the present embodiment it is possible to generate a magnetic filed which extends in any direction desired. The present embodiment can therefore achieve the Faraday rotation of sine-wave shape and obtain a compact light spectrum. For example, in a case where a polarization scrambler is formed, three-phase currents are required to the three coils 79a, 79b and 79c.

If a wavelength plate 78 is, in the structure according to this embodiment, disposed in a position (between a light emission end of the optical fiber 71 and the lens 72) in front of the light input of the Faraday device 73, the optical axis of the input light beam can be adjusted to the optical axis of the Faraday device. 73. Thus, a further improved effect can be obtained.

Figure 15:
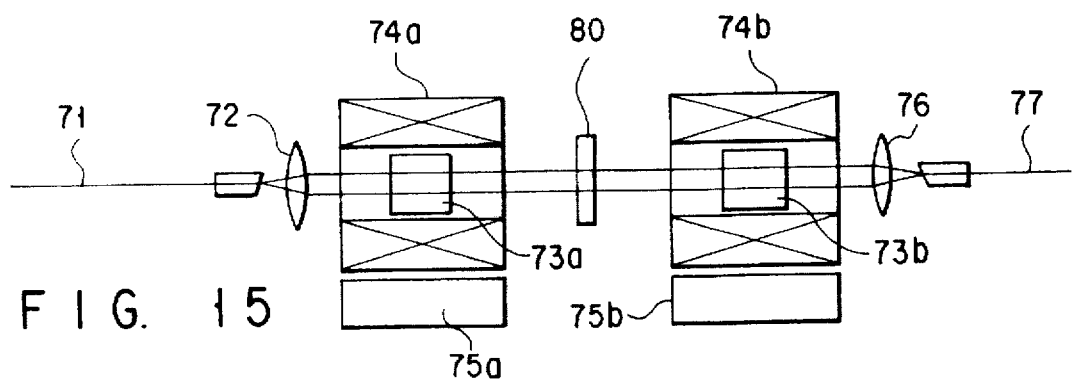
FIG. 15 is a cross sectional view showing the structure of the polarization control unit according to a third embodiment of the present invention.

FIG. 15 shows the structure of a third embodiment of the polarization control unit according to the present invention. Referring to FIG. 15, the same elements as those shown in FIG. 12 are given the same reference numerals and the same elements are omitted from illustration.

In contrast with the units according to the first and second embodiments having the structure such that the linearly polarized input light beam is converted into an arbitrarily linearly polarized light beam, the polarization control unit according to this embodiment has a function that a linearly polarized input light beam is converted into an arbitrary state of polarization or an arbitrary input polarized wave is converted into an arbitrarily linearly-polarized state.

To achieve the foregoing function, the polarization control unit according to this embodiment comprises two Faraday devices 73a and 73b, coils 74a and 74b for applying, to the Faraday devices 73a and 73b, magnetic fields running in the direction of the optical axis, magnets 75a and 75b for applying magnetic fields running in the vertical direction with respect to the optical axis and wavelength plate 80.

In a case where a linearly polarized wave is input from the fiber 71, it can be converted into an arbitrary linearly-polarized wave by the Faraday device 73a. When the linearly polarized wave is made incident upon the wavelength plate 80, it is converted into an elliptically polarized wave. Since the ellipticity is determined by the axis of the wavelength plate 80 and the direction of the polarization, an elliptically polarized wave having an arbitrary ellipticity can be realized by the Faraday device 73a and the wavelength plate 80.

Moreover, the major and minor axes of the ellipse are rotated by the Faraday device 73b due to the Faraday effect so that conversion to an arbitrary elliptically-polarized wave is performed. Since also the linearly polarized wave and circularly polarized wave are kinds of the elliptically polarized wave, conversion to an arbitrarily polarized wave state can be performed. As for the input of an arbitrarily polarized wave state, a contrary process to the foregoing is performed so that conversion to a specific linearly-polarized wave is performed.

Note that the two magnets for applying the vertical magnetic field are not required to be formed into one pair, one magnet may be employed to form a magnetic field as shown in FIG. 15 though the intensity of the magnetic field and the parallelism are somewhat worsened.

Figure 16:
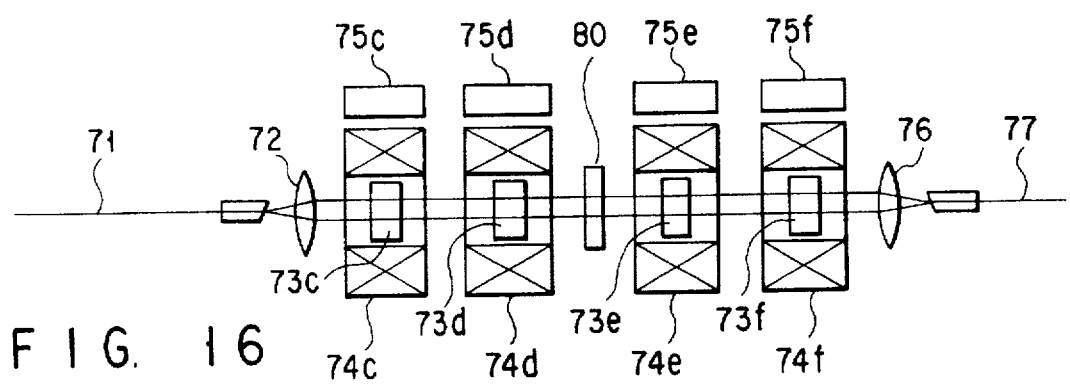
FIG. 16 is a cross sectional view showing the structure of the polarization control unit according to a fourth embodiment of the present invention.

FIG. 16 shows the structure of a fourth embodiment of the polarization control unit according to the present invention. The polarization control unit according to this embodiment has a structure such that each of the Faraday devices 3a and 3b shown in FIG. 15 is divided into a plurality of devices (which are two in the illustrated case). The characteristics of the Faraday device in the plane are not always uniform and the modulation degree of the intensity and the extinction ratio are non-uniform. Therefore, excellent characteristics can be realized by individually disposing a plurality of garnet films to adjust the structure such that parallel light beams pass through excellent portions of the elements as compared with the structure formed such that a plurality of garnet films are stacked and bonded into an integrated form.

The polarization control unit shown in FIG. 16 has a structure such that a Faraday device corresponding to the Faraday device 73a shown in FIG. 15 is divided into sections 73c and 73d and that corresponding to the Faraday device 73b is divided into sections 73e and 73f. Also coils and magnets for operating the Faraday devices 73c, 73d, 73e and 73f are divided into sections 74c to 74f and sections 75c to 75f.

Although the polarization control unit has been described, the structure according to the present invention may, of course, be employed as a polarization scrambler. Since the loss change can be reduced in this case, the optical receiver is not affected by noise. Since the deterioration in the extinction ratio is prevented and the repeatability is excellent, a polarization scrambler exhibiting a low remaining degree of polarization can be realized.

Specifically, the polarization control unit shown in FIG. 12 is required such that the coil 74 is supplied with a sine AC signal to make the amount of the Faraday rotation to be substantially ±70°. The polarization control unit shown in FIG. 14 is required such that the terminal of each of the three coils 79a, 79b and 79c is supplied with a three-phase current. The polarization control units respectively shown in FIGS. 15 and 16 are required such that the coil 73a or the coil 73c and the coil 73d are supplied with an AC signal having frequency f1 and the coil 73b or the coil 73e and the coil 73f are supplied with an AC signal having frequency f2 which is different from the frequency f1. Thus, a polarization scrambler can be realized.

The structure of an operation signal source for supplying an operation current (an AC signal) to the coil in the case where the polarization control unit having the foregoing structure is used as the polarization scrambler will now be described while the polarization control unit shown in FIG. 12 being taken for example.

The coil is usually applied with a high level operation voltage of tens to hundreds volts. The reason for this is that the coil operation frequency f usually is a relatively high frequency of 10 kHz or higher which is higher than the low frequency cut off frequency of the optical amplifier. To efficiently supply the high voltage AC signals, it might be feasible to employ structures shown in FIGS. 17 and 18.

Figure 17:
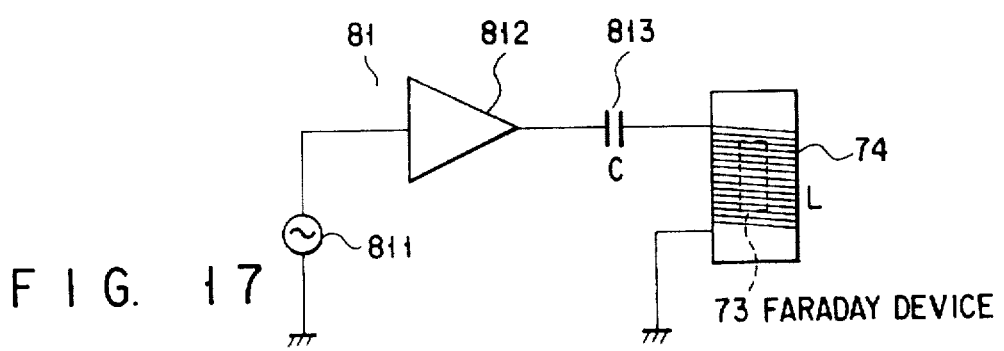
FIG. 17 is a circuit diagram showing the structure of a signal source for driving the coil according to, for example, the first embodiment.

An operation signal source 81 shown in FIG. 17 has a structure such that the power of an AC signal generated by an oscillator 811 and serving as an operation signal is amplified by an amplifier 812. An operation signal output from the amplifier 812 is, through a capacitor (capacitance: C) 813, supplied to a coil (inductance: L) 74. By setting the frequency oscillated by the oscillator 811 to be the same as or somewhat lower than resonant frequency $\omega(\omega^2=1/LC)$ which is determined by the coil 74 and the capacitor 813, an advantage can be realized in that the operation signal source 81 can stably be operated with low voltage.

Figure 18:
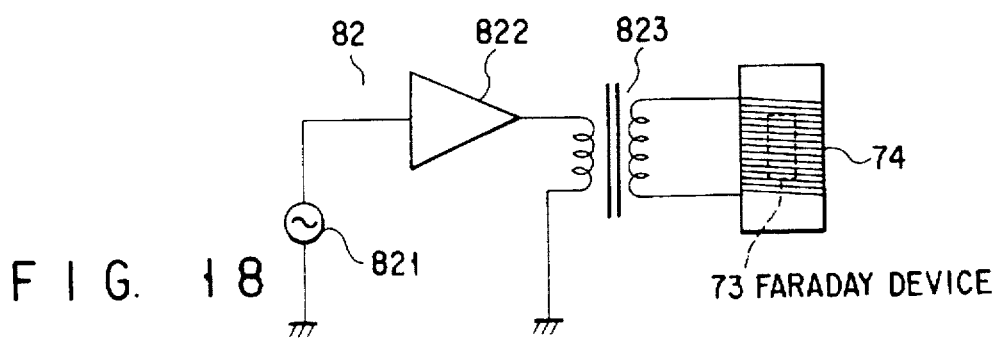
FIG. 18 is a circuit diagram showing another structure of the operation signal source for operating the coil according to, for example, the first embodiment.

The operation signal source 82 shown in FIG. 18 has a structure such that the power of an AC signal generated by an oscillator 821 and serving as an operation signal is amplified by an amplifier 822, and the level of the operation signal output from the amplifier 822 is raised by a transformer 823, followed be being supplied to the coil 74. Although the size is somewhat enlarged, an advantage can be obtained in that a high voltage level can easily be obtained.

Since both of the foregoing structures have the arrangement such that supply of the DC component to the coil 74 is prevented, stable operation without a DC drift of the operation current can be expected.

Therefore, each of the operation signal sources having the foregoing structure attains an effect of stable operation though the linearity of the Faraday effect is somewhat unstable. In particular, the method having the structure such that the capacitor 813 is serially inserted as shown in FIG. 17 enables the size to be reduced as compared with the method using the transformer 823. Since a loss caused from the transformer can be prevented, electric power consumption can be reduced. On the other hand, the method using the transformer 823 has a characteristic that the operation can stably be performed even in a case where a ferromagnetic material is employed to form the Faraday device 73 and the inductance is changed in accordance with the magnitude of the electric current flowing in the coil 74.

Since the polarization control unit comprising the Faraday device is free from deterioration in the performance as the time elapses as the DC (Direct Current) drift experienced with the electrooptical crystal, stable performance can be maintained for a long time.

In the case where the polarization control unit is employed as the polarization scrambler for use in a long-distance optical transmission, the remaining degree of polarization is required to be further improved and the loss change is required to be more reduced.

That is, it can be considered that the deterioration in the remaining degree of polarization takes place in a case where the amount of Faraday rotation is not symmetric with respect to the magnetic field component in the direction of the optical axis, the intensity of the magnetic field and the amount of Faraday rotation are not in proportion to each other and the absolute value of the amount of Faraday rotation becomes different between the case where the magnetic field is positive and the case where the same is negative.

Accordingly, the present invention has a structure such that the coil for forming the magnetic field to be applied in the direction of the optical axis of the Faraday device is applied with a signal formed by superimposing an AC signal and DC bias to adjust the amplitude of the AC signal and the DC bias so as to improve the magnetic field intensity-amount of Faraday rotation characteristic in order to reduce the remaining degree of polarization.

When a magnet for applying, to the Faraday device, a magnetic field in a direction different from that of the magnetic field formed by the coil is disposed adjacent to the Faraday device, the magnetic field formed by synthesizing the magnetic field formed by the coil and that formed by the magnet can be used to control the amount of Faraday rotation.

In the present invention, the Faraday device and the coil for applying the magnetic field to the Faraday device are enclosed in an airtight sealing package having a window structure and made of a ferromagnetic material and light is input/output through the window structure. Since the elements are enclosed in the airtight package as described above, the reliability can be improved.

In the present invention, a conductive wire is wound around a bobbin manufactured by using a material (for example, alumina) exhibiting excellent heat conductance so that the coil is formed. Moreover, the coil is directly or, through a material exhibiting excellent heat conductance, joined to the package. As a result, heat generated from the coil can be conducted to the package so as to be radiated.

The inventor of the present invention found a fact that the change in the loss occurring during the operation is caused from an air convection formed due to heat generated from the coil and the convection disorders the wave surface of the light beam. The heat generation from the coil will be described in detail. The wire for use in the coil can easily be oxidized and electric resistance of the wire is intensified when the temperature is raised. Therefore, the coil is required to be operated with a higher voltage level to maintain the same magnetic force. Thus, heat generated from the coil is further enlarged. As a result, the inventor found a fact that the heat generated from the coil can be prevented by using a material, such as alumina, having excellent heat conduction to form the coil bobbin.

Therefore, heat generated from the coil is conducted to the package as described above when to improve heat radiation so as to prevent rise in the temperature of the coil. By preventing rise in the temperature of the coil and air convention, the change in the loss can be prevented. Moreover, the reliability can significantly be improved.

In a case where an adhesive agent, which deteriorates as the temperature is raised, is used to secure the coil and the Faraday device, employment of alumina or the like to form the bobbin results in prevention of rise in the temperature of the coil and deterioration of the adhesive agent. Thus, the performance of the adhesive agent can be maintained for a long time.

The present invention is characterized by a first Faraday device, a second Faraday device and a ¼ wavelength plate disposed between the two Faraday devices. When the polarization of incident light is scrambled by applying AC magnetic fields or rotational magnetic fields having different frequencies are applied to the first and second Faraday devices, the ¼ wavelength plate is inclined to minimize the remaining degree of polarization of the polarization scrambler.

The present invention is as well as characterized in that the Faraday device is made of a garnet film formed by epitaxial growth and subjected to heat treatment.

Embodiments will now be described.

Figure 19:
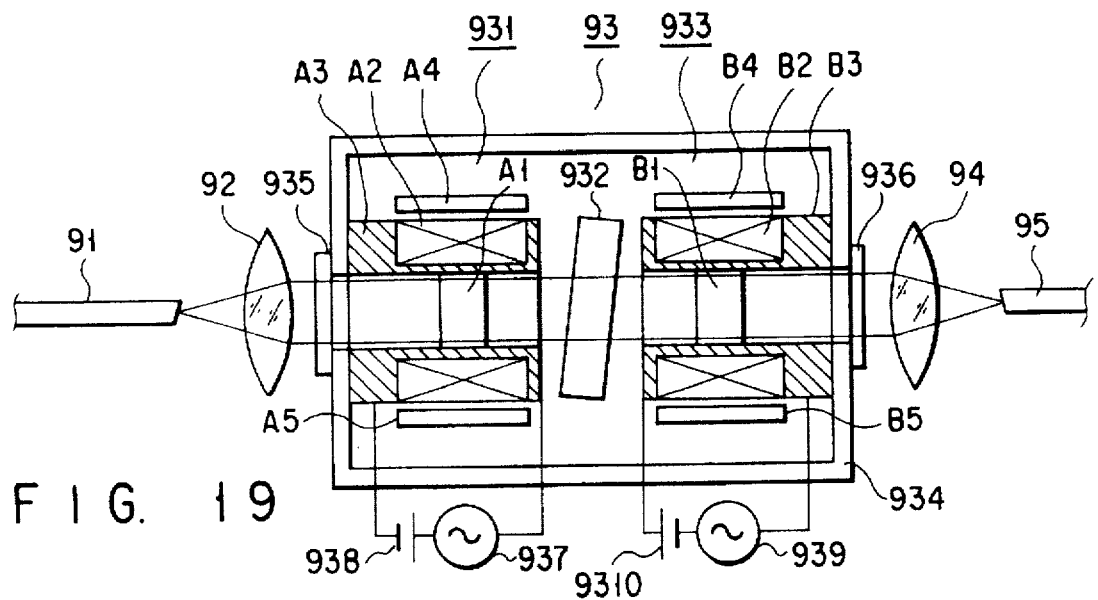
FIG. 19 is a cross sectional view showing the structure of the polarization control unit according to a fifth embodiment of the present invention.

FIG. 19 shows the structure of a fifth embodiment of the polarization control unit according to the present invention. The polarization control unit according to this embodiment comprises an optical fiber 91, a lens 92, a polarization control unit 93, a lens 94 and an optical fiber 95.

The lens 92 is a convex lens for converting light transmitted from the optical fiber 91 into parallel light beams. The lens 94 is a convex lens for converging the parallel light beams emitted from the polarization control unit 93 and polarization-scrambled into the incident end of the optical fiber 95.

The polarization control unit 93 scrambles the polarization of the transmitted light beam and comprises a first polarization modulator 931, a ¼ wavelength plate 932, a second polarization modulator 933, a package 934, glass windows 935 and 936, a first AC signal generator 937, a first bias power source 938, a second AC signal generator 939 and a second bias power source 9310. The first polarization modulator 931 comprises a Faraday device A1, a coil A2, a coil bobbin A3 and magnets A4 and A5. Similarly, the second polarization modulator 933 comprises a Faraday device B1, a coil B2, a coil bobbin B3 and magnets B4 and B5.

As shown in FIG. 19, the first polarization modulator 931, the ¼ wavelength plate 932 and the second polarization modulator 933 are accommodated in the package 934 capable of completely sealing the foregoing elements. Thus, light input is performed through the glass window 935, while light output is performed through the glass window 936.

The Faraday devices A1 and B1 may be made of, for example, the garnet film formed by epitaxial growth. Since the garnet film formed by epitaxial growth has vertical anisotropy, it is preferable that the anisotropy be reduced by performing heat treatment to use the garnet film as the Faraday device.

As has been known, light made incident upon the Faraday device is Faraday-rotated when allowed to pass through the Faraday device. Since the amount of Faraday rotation is determined in accordance with the electric current flowing through the coil, application of an AC signal to the coil enables the polarization to be scrambled.

As described later, this embodiment has a structure such that the remaining degree of polarization is reduced by applying an AC signal and a DC bias to the coil while superimposing the AC signal and the DC bias, the coil being a coil for forming a magnetic field to be applied in the direction of the optical axis of the Faraday device. Specifically, the coil A2 is, as shown in FIG. 19, operated by the first AC signal generator 937 having a predetermined frequency f1 and the DC bias power source 938. Moreover, the coil B2 is operated by the second AC signal generator 939 having frequency f2 different from f1 and the DC bias power source 9310.

As a result, the Faraday devices A1 and B1 respectively are applied with AC magnetic fields running in the direction of the optical axis from the coils A2 and B2 which are operated by the AC signal generators 937 and 939 and the bias power sources 938 and 9310.

Note that the Faraday devices A1 and B1 may be, in addition to the foregoing magnetic fields, applied with predetermined magnetic fields in a direction perpendicular to the optical axis by the pair of magnets A4 and A5 and that of the magnets B4 and B5. It is preferable that the Faraday devices A1 and B1 made of the ferromagnetic material be magnetically saturated with the magnetic fields generated by the foregoing magnets. As a result, the Faraday devices A1 and B2 are always operated in the saturated regions so that the intensity modulated components are reduced and, therefore, stable operation preferably is realized. In the foregoing case where saturation is established in all states, the amount of Faraday rotation does not depend upon the intensity change of the synthesized magnetic field and depends upon only the change in the direction of the magnetic field. Since the intensity of the magnetic fields formed by the magnets is constant, the amount of Faraday rotation depends upon only the intensity of the magnetic fields in the direction of the optical axis formed by the coils.

In the foregoing structure, transmission light beams are, after emitted from the optical fiber 91, converted into parallel light beams by the lens 92, and then allowed to pass through the glass window 935 and made incident upon the Faraday device A1 in the package 934. The Faraday device A1 scrambles the linearly polarized component of incident light. The circularly polarized component, which is not scrambled by the Faraday device A1, is converted into linearly polarized wave by the ¼ wavelength plate 932, and then scrambled by the Faraday device B1.

Light, the polarization of which has been scrambled, is allowed to pass through the glass window 936 so as to be emitted to the outside of the package 934. Then, emitted light is converged to the incident end of the optical fiber 95 so as to be transmitted to a next unit through the optical fiber 95.

Then, description will now be performed about reduction in the remaining degree of polarization which is enabled by applying a signal formed by superimposing the AC signal and the DC bias to the coil for forming the magnetic field to be applied into the direction of the optical axis of the Faraday device.

When the Faraday effect is attained by applying the AC signal magnetic field or the rotational magnetic field to the Faraday device of the polarization modulator comprising the Faraday device, the amounts of Faraday rotation are not always with respect to the direction of the magnetic field. In an example structure in which a magnet for applying a DC magnetic field in a direction perpendicular to the direction of the AC magnetic field generated by the coil and a synthesized magnetic field of the coil and the magnet is applied to the Faraday device, the amounts of Faraday rotation are not symmetric with respect to the direction of the magnetic field generated by the coil. The reason for this can be considered that the Faraday device has anisotropy or the DC magnetic field generated by the magnet is not completely perpendicular to the AC magnetic field generated by the coil.

Figure 20A:
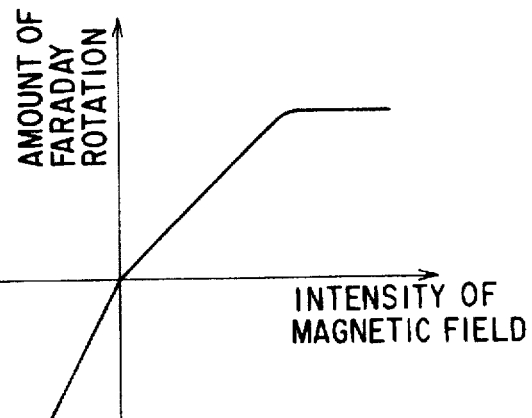
FIGS. 20A, 20B and 20C are waveform graphs for explaining the relationship between the DC bias current to be supplied to the coil of the polarization control unit according to the fifth embodiment and reduction in the remaining degree of polarization.
Figure 20B:
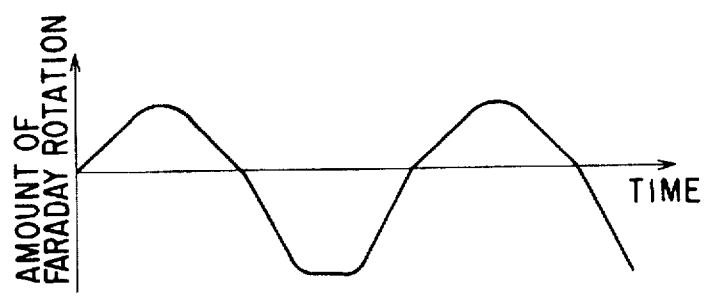

If the intensity of the AC magnetic field and the Faraday rotation are not in proportion to each other and if the absolute value of the amount of Faraday rotation becomes different between the case where the magnetic field is positive and the case where the same is negative, the remaining degree of polarization of the polarization scrambler deteriorates. The foregoing state will now be described with reference to FIGS. 20A to 20C. FIG. 20B shows a state of Faraday rotation realized when a sine wave AC magnetic field is applied in a case where the intensity of the magnetic field and the amount of Faraday rotation do not hold symmetrical proportional relationship as shown in FIG. 20A. Even if the amplitude is adjusted in this state, the waveform is the same and, thus, the remaining degree of polarization cannot be made to be zero.

Figure 20C:
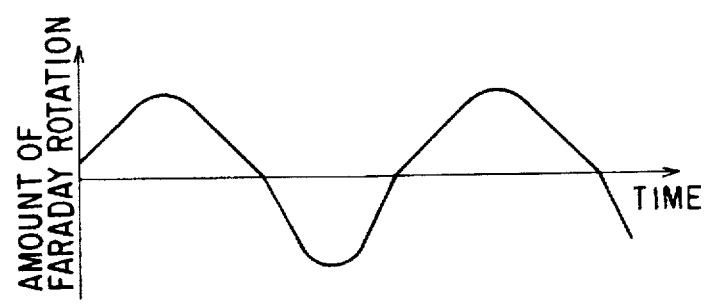

However, if a DC bias current is allowed to flow in the coil and the magnitude of the electric current is adjusted, the waveform can be changed, as shown in FIG. 20C. In particular, a ferromagnetic material having a region in which the amount of Faraday rotation is saturated as shown in FIG. 20A involves considerable change in the waveform.

Thus, use of the saturated region enables the waveform to considerably be changed so as to reduce the remaining degree of polarization.

Figure 21:
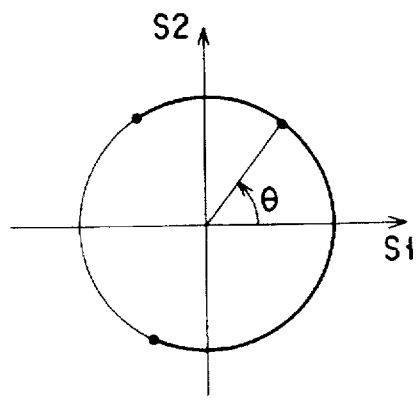
FIG. 21 is a cross sectional view showing the cross section of the equator of the Poincare sphere for use to obtain the amplitude and the bias current for making the degree of polarization to be zero in the polarization control unit according to the fifth embodiment.

In actual, the state of polarization can be displayed on the Poincare sphere and integration on the Poincare sphere enables the amplitude and the bias current for making the degree of polarization to be zero to be obtained. The cross section of the equator of the Poincare sphere is shown in FIG. 21. Since the linearly polarized light is plotted on the circumference, points moves on the circumference due to the Faraday rotation. Assuming that the angle made by the point from the S1 axis is θ (t) and the point moves at period (T), the degree of polarization can be made to be zero when the time average of component S1 and component S2 is made to be zero. Thus, the condition for making the degree of polarization to be zero is expressed by a fact that Equations (1) and (2) are satisfied.

$$\cos \theta(t) \, dt = 0 \quad (1)$$

$$\sin \theta(t) \, dt = 0 \quad (2)$$

The application of the bias is to change the time waveform of θ (t), that is, the application bias is not a simple shift of the same. As a result, adjustments of the amplitude and the bias enables Equations (1) and (2) to be simultaneously satisfied so that the remaining degree of polarization is reduced.

Figure 22:
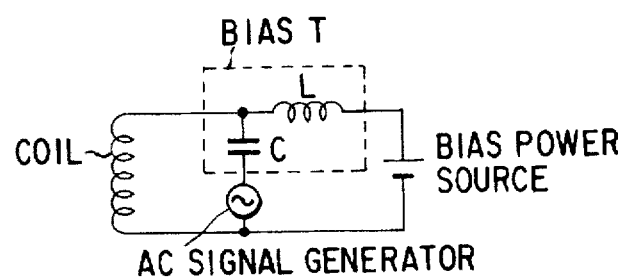
FIG. 22 is a circuit diagram showing the structure of an operation signal source using bias T for operating the polarization control unit according to the fifth embodiment.

The coils A2 and B2 may be operated by a parallel connection using a bias T as well as well as the serial connection of the AC signal generator and the DC bias power source to each other as shown in FIG. 19. That is, as shown in FIG. 22, terminal L and C of the bias T are connected to the coil and the terminal C is connected to the AC signal generator. Moreover, the terminal L is connected to the DC bias power source. It is preferable that L of the bias T is made to be equivalent or larger than the inductance of the coil and has a small resistance component. By setting C of the bias T to be capable of resonating with the inductance obtained by synthesizing the inductance of the coil and that of the bias T, the coil can be operated with low AC amplitude voltage.

It is preferable that the leading ends of the optical fibers 91 and 95 be diagonally polished to reduce reflected light. By, with respect to the optical axis, slightly inclining (about 1°) the parallel and flat plate devices, such as the Faraday devices A1 and B1, the ¼ wavelength plate 932 and the glass windows 935 and 936, the device in which reflected and returned light can be reduced can be realized.

The package and the glass windows will now be described.

As described above, the polarization control unit shown in FIG. 19 has the package 934 capable of completely sealing and accommodating the first polarization modulator 931, the ¼ wavelength plate 932 and the second polarization modulator 933. Light input and output are performed through the glass windows 935 and 936.

If the material of the package 934 is a ferromagnetic material, such as Kovar, an effect of a magnetic shield can be obtained so that influence of an external magnetic field is eliminated satisfactorily.

It is preferable that the size of each of the opening portions of the glass windows 935 and 936 be limited to improve the effect of the magnetic shield.

It is preferable that the material for the glass windows 935 and 936 be glass having the same expansion coefficient as that of the material for the package. In a case where sapphire or the like is employed which has birefringence, setting is required to be parallel or perpendicular to the optical axis of crystal to prevent the change in the polarization being the change in the intensity of light.

The adjustment of the inclination of the ¼ wavelength plate 932 will now be described.

As shown in FIG. 19, in the polarization control unit 83, having a structure such that the two polarization modulators 931 and 933 are disposed serially and the ¼ wavelength plate 932 is disposed between the two polarization modulators 931 and 933 to scramble polarization by applying an AC magnetic field or a rotational magnetic field to each of the Faraday devices A1 and B1, the Faraday device A1 of the first polarization modulator 931 scrambles the linearly polarized light. Circularly polarized light is converted into linearly polarized light by the ¼ wavelength plate 932, followed by being scrambled by the Faraday device B1 of the second polarization modulator 933. Since elliptically polarized light can be decomposed into linearly polarized light and circularly polarized light in general, the respective components are scrambled by the forward Faraday device A1 or the rearward Faraday device B1.

To perform the foregoing operation, the linearly polarized component and the circularly polarized component must appropriately be held in the Faraday devices A1 and B1 and the circularly polarized light must correctly be converted into linearly polarized light by the ¼ wavelength plate 932. However, linearly polarized light is as well as converted into elliptically polarized light in the Faraday device due to magnetic circular dichroism as well as birefringent caused from stress applied during the growth of crystal and birefringent taking place due to Cotton-Mouton effect. If the ¼ wavelength plate has incomplete factor, the foregoing operation cannot correctly be performed.

To eliminate the foregoing influences, it is effective to adjust the inclination of the ¼ wavelength plate 932. If the ¼ wavelength plate 932 is inclined, the phase difference characteristic of the ¼ wavelength plate 932 is deviated from 90°. Moreover, increase and decrease are permitted depending upon the direction of inclination. Therefore, the foregoing incompleteness of present invention can considerably be solved.

Then, description will now be performed about a method of adjusting the voltage of the AC signal, the bias voltage and the angle of inclination of the ¼ wavelength plate in such a manner that the remaining degree of polarization can be minimized. The following procedure may be employed for example.

Initially, linearly polarized light is made incident in a state where the ¼ wavelength plate 932 is not inserted. Only the coil A1 is operated and the output voltage from the first AC signal generator 937 and that from the first bias power source 938 are adjusted in such a manner that the remaining degree of polarization can be minimized. Then, only the coil B1 is operated and the output voltage from the second AC signal generator 939 and that from the second bias power source 9310 are adjusted in such a manner that the remaining degree of polarization can be minimized. Finally, the ¼ wavelength plate 932 is inserted so that an incident polarized state, with which the remaining degree of polarization is enlarged, is realized. Then, the angle of inclination of the ¼ wavelength plate 932 is adjusted so that the remaining degree of polarization is minimized.

Then, a countermeasure against generated heat will now be described.

As described above, the coil bobbins A3 and B3 are made of the material, such as alumina, exhibiting excellent heat conductivity. Therefore, prevention of rise in the temperature of each of the coils A2 and B2 as described above enables deterioration of the adhesive agent being prevented. Thus, the performance of the adhesive agent can be maintained for a long time. Hence, change in the loss during the operation can be prevented, improving the reliability significantly.

Polymer resin usually employed to make the coil bobbin has unsatisfactory heat conduction and thus the temperature is raised, resulting in deformation to take place. However, the alumina bobbin has an advantage that it cannot be deformed.

Figure 23A:
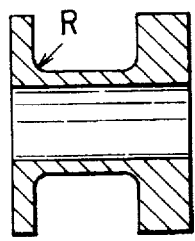
FIGS. 23A and 23B respectively are cross sectional view and a front view showing the structure of a coil bobbin according to the fifth embodiment.
Figure 23B:
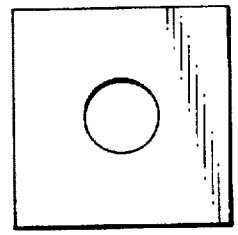

An example of the schematic structure of each of the coil bobbins A3 and B3 is shown in FIGS. 23A and 23B. FIG. 23A is a cross sectional view, and FIG. 23B is a front view. As shown in FIG. 23A, the coil bobbin can be mechanically strengthened when the boundary between the coil winding portion and the flange is rounded because the concentrated stress is moderated. If the rounded portion is omitted, heat generated from the coil causes the wire for the coil to be expanded. As a result, the flange can sometimes be broken.

If the distance between each of the coils A2 and B2 and the package 934 is too short, an eddy current is generated in the package 934, thus causing loss to take place when the magnetic fields are generated by the coils A2 and B2. To prevent this, it is preferable that the package 934 and each of the coils A2 and B2 be made to be apart from each other by about the distance corresponding to an effective diameter (which substantially, the same as the mean value of the inner diameter and the outer diameter of the coil) of each of the coils A2 and B2. To obtain the foregoing distance, the flange to be bonded to the package 934 is required to be thickened.

If the magnets A4, A5, B4 and B5 are attached to the flanges, it is preferable that the flange be formed into a quadrilateral, as shown in FIG. 23B. Although omitted from illustration, if the flange, which is not bonded to the package 934, is bridged to the package 934 by a member made of alumina or the like, the mechanical strength and the heat radiation effect can be improved.

In order to improve the reliability, it is effective to completely seal the polarization modulator including the coils A2 and B2, as described above. When the internal portion of the package 934 is filled with argon gas or nitrogen gas to completely seal the package 934, introduction of dust can be prevented. Thus, the optical loss can be stabled for a long time. Since water invasion can be prevented in this case, deterioration of the adhesive agent can be prevented. In particular, the foregoing contrivance is effective when employed to seal the ¼ wavelength plate 932 and Faraday devices A1 and B1 each having the structure such that the light transmission portions are stacked and bonded to one another by an optical adhesive agent. Since invasion of oxygen gas and carbon dioxide gas can be prevented, oxidation of the wire and weathering of the optical glass can be prevented.

Although the foregoing embodiment comprises the pair of polarization modulators each comprising the Faraday devices A1 and B1 and the coils A2 and B2, only one polarization modulator is required if incident light is linearly polarized and has no circularly polarized component.

As an example of the structure of the foregoing type, an example of a polarization scrambler for scrambling and outputting linearly polarized light from a semiconductor laser unit will now be described with reference to FIG. 24.

Figure 24:
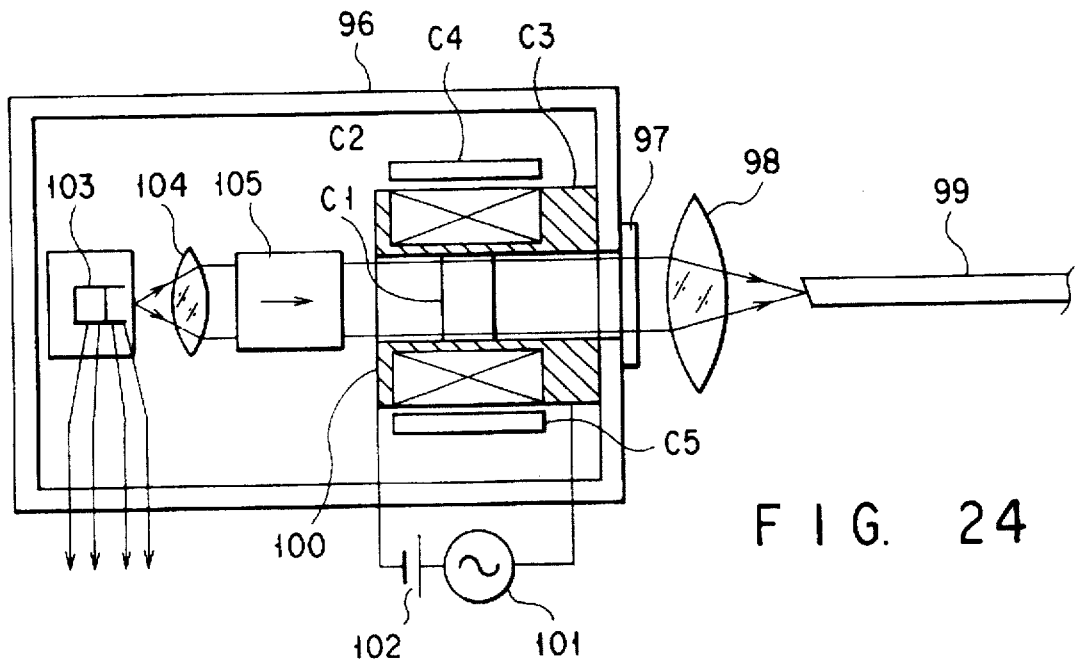
FIG. 24 is a cross sectional view showing the structure of the polarization control unit according to a sixth embodiment of the present invention.

FIG. 24 shows a sixth embodiment of the polarization control unit according to the present invention. As shown in FIG. 24, each element is accommodated in a package 96 capable of sealing the internal portion thereof. Light output is performed through a glass window 97, followed by being converged to the leading end of an optical fiber 99 by a lens 98. Then, light is conducted to a next optical unit through the optical fiber 99.

The package 96 accommodates a polarization modulator 100. The polarization modulator 100 comprises a Faraday device C1, a coil C2, a coil bobbin C3 and magnets C4 and C5. The polarization modulator 100 is operated by an AC signal generator 101 and a DC bias power source 102.

The compositions, structures, materials, operations and so forth of the package 96, the glass window 97, the lens 98, the optical fiber 99, the polarization modulator 100 and the their operation circuit portions 101 and 102 according to this embodiment may be the same as those of the package 94, the glass window 936, the lens 94, the optical fiber 95, the second polarization modulator 993 and their operation circuit portions 939 and 9310 shown in FIG. 19. Therefore, they are omitted from the description here.

Referring to FIG. 24, reference numeral 103 represents a semiconductor laser having a modulator for emitting modulated linearly polarized light. The emitted light beams are converted into parallel light beams by a lens 104, and the allowed to pass through an isolator 105. Then, light is made incident upon the Faraday device C1.

The Faraday device C1 applies an AC magnetic field in a direction of the optical axis by the coil C2 wound around the coil bobbin C3.

Similarly to the fifth embodiment, magnetic fields running perpendicularly to the optical axis are applied in addition to the magnetic field generated by the coil C2. The magnetic fields generated by the magnets C4 and C5 are used to magnetically saturate the Faraday device C1 made of the ferromagnetic material. Since the Faraday device is always operated in the saturated region as described above, intensity modulation component can be reduced and thus stable operation can be performed.

The coil C2, the AC signal generator 101 and the DC bias power source 102 are operated to operate the Faraday device C1 so as to scramble light. As described in the fifth embodiment, adjustment of the voltage enables the remaining degree of polarization to be lowered.

Scrambled light is allowed to pass through the glass window 97, and then converged to the optical fiber 99 by the lens 98 so as to be emitted.

As described above, linearly polarized incident light can be polarization-scrambled with a simple structure in such a manner that the remaining degree of polarization has been lowered.

Similarly to the fifth embodiment, heat generated by the coil C2 is conducted through the coil bobbin C3 made of alumina, which exhibits excellent heat conductivity, and then conducted to the package 96. In a case where the semiconductor laser 103 having a modulator is cooled by a Peltier device or the like, also heat generated by the Peltier device is conducted to the package 96. Therefore, a further satisfactory effect can be obtained if a heat radiation plate is provided on the outside of the package 96.

Similar structures to those of the fifth embodiment attain similar results and operations such that when the package 96 is made of a ferromagnetic material, such as Kovar, an effect of a magnetic shield can be obtained with which an influence of an external magnetic field can be eliminated satisfactorily. Moreover, it is preferable that the opening portion of the glass window 97 is not enlarged excessively to obtain a satisfactory magnetic shield. It is preferable that the material of the glass window 97 be glass having the same expansion coefficient as that of the material of the package. It is preferable that the material of the coil bobbin C3 be alumina or the like exhibiting excellent heat conductance. It is preferable that heat generated by the coil C2 be conducted through the coil bobbin C3 made of alumina or the like to the package 96.

In the polarization control unit comprising the Faraday device as described above, the following structures are effective when employed in a polarization control unit (a polarization modulator) of a type in which the DC bias is not superimposed on the AC signal for operating the coil for forming the magnetic field to be applied into the direction of the optical axis of the Faraday device: (1) the angle of inclination of the ¼ wavelength plate is adjusted; (2) alumina exhibiting excellent heat conductivity is employed as the material for the coil bobbin; (3) heat generated by the coil is conducted to the package through the coil bobbin made of alumina or the like; and (4) the Faraday device and the ¼ wavelength plate are accommodated in the package capable of completely sealing the inside thereof to cause light to output/input through the glass window of the package.

The present invention is not limited to the foregoing embodiments and various modifications are permitted within the technical range thereof.

As described above, according to the present invention, the coil for forming a magnetic field, to be applied to the direction of the optical axis of the Faraday device, is supplied with a signal formed by superimposing an AC signal and a DC bias to improve the magnetic field intensity-amount of Faraday rotation characteristic. Thus, a polarization scrambler can be realized which is free from change in the loss and deterioration in the remaining degree of polarization and exhibiting reliability for a long time.

The scrambler according to the present invention is able to significantly improve the receiver sensitivity of an optical amplified optical transmission system. As a result, light transmission can reliably be performed for a long time.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A polarization control unit comprising:
   a Faraday device for rotating the polarization state of incident parallel light beams by an amount corresponding to the direction of a magnetic field applied;
   magnetic field forming means respectively disposed near said Faraday device, arranged to apply, to said Faraday device, magnetic fields from a plurality of directions and to generate a Synthesized magnetic field, the direction of which is changed in response to an operation signal; and an operation signal source for generating the operation signal.

2. A polarization control unit according to claim 1, wherein said operation signal source generates an AC signal as the operation signal.

3. A polarization control unit according to claim 2, wherein said operation signal source forms the operation signal by adding a DC bias signal to the AC signal.

4. A polarization control unit according to claim 1, wherein said magnetic field forming means applies a predetermined magnetic field in a direction perpendicular to said parallel light beams and applies, in the same direction as that of the parallel light beams, a magnetic field, the intensity of which is changed in response to the operation signal.

5. A polarization control unit according to claim 1, wherein said magnetic field forming means has a magnet disposed adjacent to said Faraday device and arranged to form a magnetic field perpendicular to the optical axis of said Faraday device and a coil disposed adjacent to said Faraday device and arranged to form a magnetic field in parallel to the optical axis, the direction and intensity of the magnetic field being changed in accordance with the magnitude and the polarity of an electric current of the operation signal; and said operation signal source controls the magnitude and the polarity of the electric current of said operation signal to change the direction of the synthesized magnetic field generated by said magnet and said coil.

6. A polarization control unit according to claim 5, wherein said operation signal source has a capacitor provided between an output terminal for the operation signal, and the capacitance of said capacitor and the inductance of said coil are of such values as to resonate with an AC frequency of the operation signal.

7. A polarization control unit according to claim 5, wherein said Faraday device and said magnetic field forming means are provided within an airtight sealing package having a window through which light is to be input to and output from the unit, said coil has a bobbin made of a material exhibiting high heat conductivity and a conductive wire wound around the bobbin, and said coil is connected to said package directly or by a mass of material exhibiting high heat conductivity, thereby to radiate the heat generated by said coil.

8. A polarization control unit according to claim 7, wherein said bobbin has a core around which the conductive wire is wound, a pair of flanges formed integral with both ends of the core, and a rounded joint portion connecting the core and the flanges.

9. A polarization control unit according to claim 1, wherein said magnetic field forming means has three or more coils respectively disposed adjacent to said Faraday device and arranged to form magnetic fields in different directions with respect to the optical axis of said Faraday device, and said operation signal source controls the magnitude and the polarity of an electric current to be supplied to each coil so as to change the direction of the synthesized magnetic field generated by said coils.

10. A polarization control unit according to claim 9, wherein said operation signal source has a capacitor provided between an output terminal for the operation signal, and the capacitance of said capacitor and the inductance of said coil are of such values as to resonate with an AC frequency of the apportion signal.

11. A polarization control unit according to claim 9, wherein said Faraday device and said magnetic field forming means are provided within an airtight sealing package having a window through which light is to be input to and output from the unit, said coil has a bobbin made of a material exhibiting high heat conductivity and a conductive wire wound around the bobbin, and said coil is connected to said package directly or by a mass of material exhibiting high heat conductivity, thereby to radiate the heat generated by said coil.

12. A polarization control unit according to claim 11, wherein said bobbin has a core around which the conductive wire is wound, a pair of flanges formed integral with both ends of the core, and a rounded joint portion connecting the core and the flanges.

13. A polarization control unit according to claim 1, wherein said optical Faraday device is made of an epitaxial growth film except a vertical anisotropy.

14. A polarization control unit according to claim 1, wherein said optical Faraday device is formed by subjecting an epitaxial growth film of $(RBi)_3(FeGaAl)_5O_{12}$ (R is at least one rare earth element selected from a group consisting of gadolinium (Gd), terbium (Tb), holmium (Ho) and ytterbium (Yb)) to heat treatment at 900°0 C. to 1200° C. for one hour or longer.

15. A polarization control unit according to claim 1, wherein said Faraday device is used in a saturated region.

16. A polarization control unit according to claim 1, wherein a plurality of polarization control portions, each consisting of said Faraday device, said magnetic field forming means and said operation signal source, are serially disposed on the same optical axis, wavelength plates are provided which are disposed among the plural polarization control portions and each of said polarization control portions independently controls a synthesized magnetic field formed by each magnetic field forming means.

17. A polarization control unit according to claim 16, wherein said polarization control portion has a plurality of pairs consisting of said Faraday device and said magnetic field forming means and disposed serially on the same optical axis to cause a common operation signal source to control the synthesized magnetic field formed by each magnetic field forming means.

18. A polarization control unit according to claim 1, wherein said Faraday device and said magnetic field forming means are enclosed in an airtight sealing package having a window structure so that light is input/output through the window structure.

19. A polarization control unit comprising a first Faraday device, a second Faraday device and a ¼ wavelength plate disposed between the two Faraday devices and arranged such that AC magnetic fields or rotational magnetic fields having different frequencies are applied to said first and second Faraday devices so as to scramble polarization of incident light, wherein said ¼ wavelength plate is inclined with respect to the incident optional axis in such a manner that a remaining degree of polarization of said incident light can be minimized.

20. A polarization control unit according to claim 19, wherein said Faraday device is formed by subjecting an epitaxial growth garnet film to heat treatment.

* * * * *